(12) United States Patent
Ochiai et al.

(10) Patent No.: US 9,175,164 B2
(45) Date of Patent: *Nov. 3, 2015

(54) PROCESS FOR PRODUCING POLYMER ALLOY, POLYMER ALLOY, AND MOLDED ARTICLE

(75) Inventors: Shinichiro Ochiai, Nagoya (JP); Sadayuki Kobayashi, Nagoya (JP)

(73) Assignee: Torray Industries, Inc. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/119,207

(22) PCT Filed: May 16, 2012

(86) PCT No.: PCT/JP2012/062453
§ 371 (c)(1),
(2), (4) Date: Nov. 21, 2013

(87) PCT Pub. No.: WO2012/165141
PCT Pub. Date: Dec. 6, 2012

(65) Prior Publication Data
US 2014/0107273 A1   Apr. 17, 2014

(30) Foreign Application Priority Data

| May 31, 2011 | (JP) | 2011-121496 |
| Sep. 28, 2011 | (JP) | 2011-212070 |
| Dec. 19, 2011 | (JP) | 2011-276938 |

(51) Int. Cl.

| C08J 3/20 | (2006.01) |
| C08J 5/00 | (2006.01) |
| C08L 77/00 | (2006.01) |
| C08L 101/00 | (2006.01) |
| C08L 77/02 | (2006.01) |
| C08J 3/00 | (2006.01) |
| C08L 23/12 | (2006.01) |
| C08L 67/03 | (2006.01) |
| B29C 47/00 | (2006.01) |
| B29C 47/60 | (2006.01) |
| B29C 47/92 | (2006.01) |
| B29C 47/10 | (2006.01) |
| B29B 7/72 | (2006.01) |
| B29C 47/64 | (2006.01) |
| B29B 7/48 | (2006.01) |
| B29B 7/82 | (2006.01) |
| B29B 7/90 | (2006.01) |

(52) U.S. Cl.
CPC ............ *C08L 77/02* (2013.01); *B29C 47/0007* (2013.01); *B29C 47/0011* (2013.01); *B29C 47/0066* (2013.01); *B29C 47/1009* (2013.01); *B29C 47/6087* (2013.01); *B29C 47/92* (2013.01); *C08J 3/005* (2013.01); *C08L 23/12* (2013.01); *C08L 67/03* (2013.01); *B29B 7/482* (2013.01); *B29B 7/726* (2013.01); *B29B 7/82* (2013.01); *B29B 7/90* (2013.01); *B29C 47/64* (2013.01); *B29C 2947/92704* (2013.01); *B29C 2947/92895* (2013.01); *C08L 2205/02* (2013.01)

(58) Field of Classification Search
None
See application file for complete search history.

(56) References Cited

U.S. PATENT DOCUMENTS

| 2008/0246181 A1* | 10/2008 | Zhu et al. ...................... 264/239 |
| 2012/0123056 A1* | 5/2012 | Kobayashi et al. ........... 525/148 |

FOREIGN PATENT DOCUMENTS

| JP | 45-3368 | 2/1970 |
| JP | 52-12240 | 4/1977 |
| JP | 61-007332 A | 1/1986 |
| JP | 2003-286414 A | 10/2003 |
| JP | 2004-231909 | 8/2004 |
| JP | 2009-046641 A | 3/2009 |
| JP | 2011-046936 A | 3/2011 |
| WO | 2009/041335 A1 | 4/2009 |
| WO | 2011/013517 A1 | 2/2011 |
| WO | 2011/024693 A1 | 3/2011 |

OTHER PUBLICATIONS

Jana, Sadhan C. "Chaotic Mixing: A New Technology for Polymer Blending", International Journal of Plastics Technology, vol. 6, pp. 88-92 (2003).*

J.M. Ottino et al., "Chaotic mixing processes: New problems and computational issues," Chaos, Solitons & Fractals, vol. 6, 1995, pp. 425-438 (Abstract only).

P. Wapperom et al., "The backward-tracking Lagrangian particle method for transient viscoelastic flows," Journal of Non-Newtonian Fluid Mechanics, vol. 91, Issues 2-3, Jul. 1, 2000, pp. 273-295 (Abstract only).

Utrachki, Leszek A., "Polymer Alloys and Blends Thermodynamics and Rheology," Hanser Publishers. 1989, pp. 64 and 65.

Pertinent portion of Extended European Search Report dated Nov. 14, 2014 from corresponding European Patent Application No. 12 792 649.1.

Aref, H., "Stirring by Chaotic Advection," *Journal of Fluid Mechanics*, Jun. 1984, vol. 143, No. 1, pp. 1-21.

Chien, W-L. et al., "Laminar Mixing and Chaotic Mixing in Several Cavity Flows," *Journal of Fluid Mechanics*, Sep. 986, vol. 170, No. 1, pp. 355-377.

Eckhardt, B. et al., "Turbulence Transition in Pipe Flow," *Annual Review of Fluid Mechanics*, Jan. 2007, vol. 39, No. 1, pp. 447-468.

Jana, S.C. et al., "Effects of Viscosity Ratio and Composition on Development of Morphology in Chaotic Mixing of Polymers," *Polymer*, Mar. 2004, vol. 45, No. 5, pp. 1665-1678.

(Continued)

*Primary Examiner* — Ana Woodward
(74) *Attorney, Agent, or Firm* — DLA Piper LLP (US)

(57) ABSTRACT

A process of producing a polymer alloy includes melt-kneading at least two incompatible crystalline resins in a supercooled state by chaotic mixing using a twin-screw extruder. A polymer alloy obtained by melt-kneading at least two incompatible crystalline resins has a dispersed structure that particles dispersed in the polymer alloy have an average particle size of 0.001 to 1 μm, wherein in scattering measurement, (a) a peak half-width in a spectrum obtained by plotting scattering intensity against the wavenumber of scattered light and (b) a maximum wavenumber of the peak satisfy: $0 < (a)/(b) \leq 1.5$.

2 Claims, 1 Drawing Sheet

(56) References Cited

OTHER PUBLICATIONS

Tang, H. et al., "Fluid Flow Aspects of Twin-Screw Extruder Process: Numerical Simulations of TSE Rheomixing," *Modelling and Simulation in Materials Science and Engineering*, Sep. 2003, vol. 11, No. 5, pp. 771-790.

Utrachki, L.A., "History of Commercial Polymer Alloys and Blends (from a Perspective of the Patent Literature)," *Polymer Engineering & Science*, Mid-Jan. 1995, vol. 35, No. 1, pp. 2-17.

\* cited by examiner ated during the melt-kneading under the influence of crystallization and could not be discharged. When melt-kneading two or more crystalline resins, the melt-kneading is generally performed at or higher than the melting point of a resin having a highest melting point among the crystalline resins used. However, since the viscosity of crystalline resins is sharply reduced at or higher than their melting points, a chaotically mixed state is not created because of the too low melt viscosity, resulting in a structure with ununiform dispersion, and the improving effect on heat resistance, wet-heat resistance, and mechanical properties is not sufficient. Further, using an amorphous resin results in poor durability and chemical resistance compared to when using a polymer alloy of a combination of crystalline resins and, therefore, it is problematic to use an amorphous resin as a structural material that requires durability.

PROCESS FOR PRODUCING POLYMER ALLOY, POLYMER ALLOY, AND MOLDED ARTICLE

TECHNICAL FIELD

This disclosure relates to a process of producing a polymer alloy, a polymer alloy, and a molded article. The disclosure particularly relates to a process of producing a polymer alloy that has excellent heat resistance, wet-heat resistance, and mechanical properties and can be advantageously used as a structural material.

BACKGROUND

Polymer alloys comprising two resins are classified into incompatible polymer alloys, compatible polymer alloys, and partially compatible polymer alloys. For compatible polymer alloys, two resins are compatible in the whole practical region at a temperature from glass transition temperature to decomposition temperature. For incompatible polymer alloys, two resins are incompatible in the whole region. For partially compatible polymer alloys, two resins are compatible in some regions and phase-separated in other regions, resulting in spinodal decomposition. In a compatible polymer alloy, resins are generally compatible at the molecular level, and, consequently, intermediate properties between the mixed resin components are often obtained. Thus, to make the most of the properties of two resins, studies on incompatible and partially compatible polymer alloys are actively conducted.

JP 2003-286414 A discloses making polycarbonate and polybutylene terephthalate have a two-phase continuous structure with a structure cycle of 0.001 to 1 μm or a dispersed structure with an interparticle distance of 0.001 to 1 μm by spinodal decomposition, thereby improving the mechanical strength. In the method described in JP '414, polycarbonate and polybutylene terephthalate are compatibilized by applying shear stress in an extruder, and then spinodal decomposition is caused to form an alloy structure.

WO 2009/041335 discloses that a polymer alloy having a finely and uniformly controlled structure can be obtained such that oligomers or monomers are used as precursors of at least one thermoplastic resin component among the thermoplastic resin components constituting the polymer alloy, thereby compatibilizing the thermoplastic resin component with other thermoplastic resin components and, further, chemical reaction is caused in the co-presence of two resins to induce spinodal decomposition.

Incompatible polymer alloys generally have a spherically dispersed structure with a dispersion size of 1 μm or more and, in recent years, attempts have been made to reduce the dispersion size.

JP 2009-46641 A discloses the toughness of an incompatible polymer alloy comprising polyetherimide and polyphenylene sulfide is improved by increasing the shear force during melt-kneading and adding a compatibilizer to achieve dispersion with a number average dispersed particle size of 1000 nm or less.

JP 2011-46936 A and WO 2011/013517 disclose that a polymer alloy having a finely and uniformly controlled structure can be obtained by melt-kneading by chaotic mixing, which is achieved by using a screw effective to create a chaotically mixed state and, further, by setting the temperature in a kneading zone at a temperature 1 to 70° C. higher than the glass transition temperature of a resin having a highest glass transition temperature among the resins used.

The method described in JP '414 has the limitation that when using a combination of common incompatible resins, a two-phase continuous structure with a structure cycle of 0.001 to 1 μm or a dispersed structure with an interparticle distance of 0.001 to 1 μm cannot be formed and, further, had a problem in that it is difficult to uniformly apply shear stress, which results in poor uniformity of a dispersed phase.

Also in the method described in WO '335, it is necessary to compatibilize precursors of at least one thermoplastic resin component with other thermoplastic resin components. Thus, there is a limitation that when using a combination of incompatible resins, a two-phase continuous structure with a structure cycle of 0.001 to 1 μm or a dispersed structure with an interparticle distance of 0.001 to 1 μm cannot be formed.

The method of JP '641 provides a structure with ununiform spherical dispersion, and the improving-effect on heat resistance was not sufficient.

The method of JP '936 and WO '517 is a kneading method using at least one amorphous resin. While in the case of a polymer alloy of a combination of crystalline resins, which have a low glass transition temperature, there is the problem in that when melt-kneading is performed setting the temperature of a kneading zone at a temperature 1 to 70° C. higher than the glass transition temperature, the polymers are crystal- It could therefore be helpful to provide a polymer alloy of a combination of crystalline resins with excellent heat resistance, wet-heat resistance, and mechanical properties.

SUMMARY

We thus provide a process of producing a polymer alloy comprising melt-kneading at least two incompatible crystalline resins in a supercooled state by chaotic mixing using a twin-screw extruder.

Further, the polymer alloy comprises a polymer alloy obtainable by melt-kneading at least two incompatible crystalline resins, which has such a dispersed structure that particles dispersed in the polymer alloy have an average particle size of 0.001 to 1 μm, wherein in scattering measurement, (a) a peak half-width in a spectrum obtained by plotting scattering intensity against the wavenumber of scattered light and (b) a maximum wavenumber of the peak satisfy: $0 < (a)/(b) \le 1.5$.

Further, the molded article is made of the polymer alloy described above.

In the process of producing a polymer alloy, the chaotic mixing is preferably a chaotic mixing in which, according to the particle tracking method, the logarithm of the extension of an imaginary line ($\ln L/L_0$), wherein L is a lineal length, and $L_0$ is an initial lineal length, is not less than 2.

Further, in the process of producing a polymer alloy, the supercooled state is preferably a state in which the kneading temperature in the region from a polymer melting zone to a die-head is set at a temperature of 75° C. or more higher than the glass transition temperature of a resin having a highest glass transition temperature among the crystalline resins used, and set at a temperature of 1 to 100° C. lower than the melting point of a resin having a highest melting point among the crystalline resins used. Further, the resins used are melted even at a temperature of not higher than the melting point of the resin having a highest melting point among the crystalline resins used.

Further, in the process of producing a polymer alloy, the crystalline resin is preferably at least one resin selected from polyamide, polyester, polyphenylene sulfide, polylactic acid, polypropylene, and polymethylpentene.

In the polymer alloy, the crystalline resin is preferably at least one resin selected from polyamide, polyester, polyphenylene sulfide, polylactic acid, polypropylene, and polymethylpentene.

Further, the polymer alloy is preferably any combination of resins selected from polyamide and polypropylene, polylactic acid and polypropylene, polyphenylene sulfide and polypropylene, polyester and polypropylene, polyamide and polymethylpentene, polyester and polymethylpentene, polyphenylene sulfide and polymethylpentene, polylactic acid and polymethylpentene, and polypropylene and polymethylpentene.

The molded article is preferably an injection-molded article, a film, or a sheet.

The polymer alloy can be obtained by melt-kneading two or more incompatible crystalline resins in a supercooled state by chaotic mixing using a twin-screw extruder. The polymer alloy has achieved a fine structure for the first time, although it is a polymer alloy of a combination of crystalline resins of very different polarity, for example, polyamide and polypropylene, and polyethylene terephthalate and polymathylpentene, with which combination a fine structure has hitherto been difficult to achieve. Further, by controlling the polymer alloy to have a specific structure, a molded article having excellent heat resistance, wet-heat resistance, and mechanical properties can be obtained. Thus, the polymer alloy can be advantageously used as a structural material taking advantage of excellent heat resistance, wet-heat resistance, and mechanical properties.

DETAILED DESCRIPTION

Figure 1:
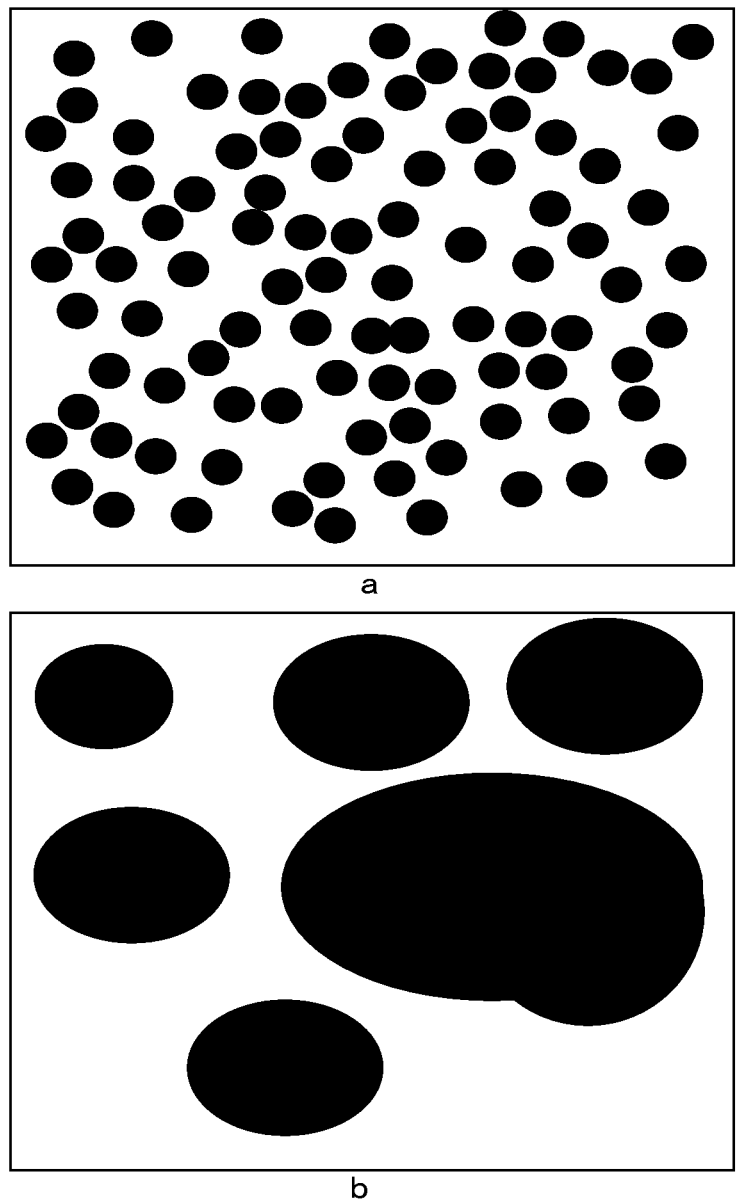
FIGS. 1a and 1b show schematic views of the configurations of phase structures of Examples and Comparative Examples, respectively.

Our methods, polymer alloys and molded articles will now be described in more detail.

We provide a process of producing a polymer alloy comprising melt-kneading at least two incompatible crystalline resins in a supercooled state by chaotic mixing using a twin-screw extruder.

In general, when mixing low-viscosity fluids such as water, they can be efficiently mixed by making their flow turbulent. When mixing high-viscosity fluids, it takes great energy to make their flow turbulent, and thus it is difficult to mix them uniformly by making their flow turbulent. In the field of chemical engineering, studies have been conducted on mixing methods by which mixing is carried out as efficiently and uniformly as possible in the state of laminar flow, and in recent years, studies on chaotic mixing have been actively conducted.

Chaotic mixing will be described. When considering mixing of two fluids, for every point on the initial interface between the two fluids, an equation governing the motion of fluid particles is solved taking the position of the point as the initial value, whereby time evolution of the interface can be determined. The interface needs to be folded at small intervals for the two fluids to mix quickly. Therefore, the area of the interface must increase rapidly and, initially, the distance between two points in close vicinity on the interface needs to increase rapidly. Thus, concerning solutions to the equation governing the motion of fluids, a mixing having a chaotic solution in which the distance between two points increases exponentially with time is called chaotic mixing. Chaotic mixing is described, for example, in Chaos, Solitons & Fractals Vol. 6, pp. 425-438.

Chaotic mixing has hitherto been used for mixing fluids such as liquids. We discovered that chaotic mixing is effective also in melt-kneading using a twin-screw extruder, and further relates to a production process applicable to two or more crystalline resins. In the method of melt-kneading two or more crystalline resins by chaotic mixing, a chaotic mixing in which alloy components are stretched and folded repeatedly can be created by lowering the kneading temperature in the region from a polymer melting zone to a die-head to a supercooled state to thereby increase the melt viscosity using a known twin-screw extruder commonly used, and by using a screw effective for creating a chaotically mixed state.

"Supercooled state" as used herein refers to a state in which even at a temperature of not higher than the melting point of a resin having a highest melting point among the crystalline resins used, the resins used are melted. The kneading temperature in the region from a polymer melting zone to a die-head for achieving a supercooled state varies depending on the combination of crystalline resins used, but it is set at a temperature of 75° C. or more higher than the glass transition temperature of a resin having a highest glass transition temperature among the crystalline resins used, and set at a temperature of 1 to 100° C. lower, preferably 10 to 90° C. lower, and particularly preferably 10 to 70° C. lower than the melting point of a resin having a highest melting point among the crystalline resins used.

When the kneading temperature is set at a temperature range lower than (the glass transition temperature+75° C.) of a resin having a highest glass transition temperature among the crystalline resins used, it is difficult to melt-knead the crystalline resins because they are crystallized and solidified. When the kneading temperature is set at a temperature range not lower than the melting point and higher than (the melting point−1° C.) of a resin having a highest melting point among the resins used, a supercooled state is not achieved, which results in too low a melt viscosity, failing to achieve chaotic mixing, and when the kneading temperature is set at a temperature range lower than (the melting point−100° C.), it is difficult to melt-knead the crystalline resins because they are crystallized and solidified, which is not preferred. The glass transition temperature can be determined using a differential scanning calorimeter (DSC) from an inflection point that occurs during temperature rising from room temperature at a temperature rise rate of 20° C./min. The melting point can be determined using a differential scanning calorimeter (DSC) from the peak temperature of a melting curve that occurs during temperature rising from room temperature at a temperature rise rate of 20° C./min.

The chaotic mixing is preferably a chaotic mixing in which, according to the particle tracking method, the logarithm of the extension of an imaginary line (ln $L/L_0$), wherein L is a lineal length, and $L_0$ is an initial lineal length, is not less than 2. When the logarithm of the extension of an imaginary line (ln $L/L_0$) is large, it means that concerning solutions to the equation governing the motion of fluids, the distance between two points is likely to increase exponentially with time. The particle tracking method is a method in which the initial positions of 1,000 particles are randomly determined at t (time)=0 in a cross-section upstream of a screw to be evaluated, and movement associated with the velocity field determined by analysis of the screw to be evaluated is tracked by simulation, and the logarithm of the extension of an imaginary line (ln $L/L_0$), wherein L is a lineal length, and $L_0$ is an initial lineal length, can be determined from the record of coordinates of each particle at each kneading temperature. The particle tracking method is described, for example, in Journal of Non-Newtonian Fluid Mechanics Vol. 91, Issues 2-3, 1 Jul. 2000, pp. 273-295.

The screw effective to achieve a chaotically mixed state is preferably such a screw that according to the particle tracking method, the logarithm of the extension of an imaginary line (ln $L/L_0$), wherein L is a lineal length, and $L_0$ is an initial lineal length, is not less than 2, more preferably 3 or more, and most preferably 4 or more.

Examples of such twin-screw extruder screws effective in creating a chaotically mixed state include a twist kneading disc comprising kneading discs having a helix angle θ in the range of 0°<θ<90° in the contra-rotating direction of the screw, the helix angle being an angle between the front apex and the rear apex of the disc; a fractional-lob kneading block comprising kneading discs that discs are basically fractional-lob-shaped and have an eccentric shaft; a fractional mixing element comprising rotors that are basically fractional-lob-shaped and have an eccentric shaft; and a back-mixing screw comprising a flight screw in which a resin passageway is formed at the flight unit from the front end toward the rear end of the screw. By alternately arranging two or more screws selected from them, chaotic mixing can be created more effectively.

The percentage of the total length of zones where melt-kneading is performed while achieving chaotic mixing (chaotic mixing zones) based on the full length of a twin-screw extruder screw is preferably 5 to 80%, more preferably 10 to 70%, and still more preferably 15 to 60%. Further, the zones where melt-kneading is performed while achieving chaotic mixing (chaotic mixing zones) in the twin-screw extruder are preferably disposed over the whole area but not localized at a specific position in the screw.

In the polymer alloy, it is preferable to stretch and fold alloy components repeatedly by chaotic mixing. By performing chaotic mixing, particles dispersed in the polymer alloy are miniaturized and, preferably, such a characteristic dispersed structure that the dispersed particles have an average particle size of 0.001 μm to 1 μm may be obtained. "Dispersed structure" as used herein refers to so-called "sea-island" structure comprising sea phase (continuous phase or matrix) formed of a largest-amount component in a resin composition and island phase (dispersed particles) formed of other resin components, and can be observed, for example, by light microscopy or transmission electron microscopy.

The crystalline resin refers to a resin having a crystal melting heat, which is observed with a differential scanning calorimeter (DSC), of 5 J/g or more during temperature rising from room temperature at a temperature rise rate of 20° C./min. Examples thereof include polyamide, polyester, polyphenylene sulfide, polylactic acid, polyolefin resins such as polyethylene, polypropylene, polymethylpentene, and syndiotactic polystyrene; polyvinyl alcohol; polyvinylidene chloride; polyacetal; polytetrafluoroethylene; crystalline polyimide; polyether ether ketone; polyether ketone; and polyketone.

Among the crystalline resins described above, polyamide, polyester, polyphenylene sulfide, polylactic acid, polypropylene, and polymethylpentene are preferably used.

The two or more incompatible crystalline resins refers to a combination of crystalline resins that will not be compatible in the whole practical region at a temperature from glass transition temperature to decomposition temperature, i.e., a combination of two or more different crystalline resins each of which individually forms a phase structure of 0.001 μm or more in a principal phase. Whether the resins are compatible or not can be judged by various methods, for example, electron microscopy, differential scanning calorimetry (DSC), and the like as described in Polymer Alloys and Blends, Leszek A Utracki, hanser Publishers, Munich Viema New York, P64. Specifically, when thermoplastic resins have the same glass transition temperature measured by differential scanning calorimetry (DSC), they can be judged to be compatible, and when different glass transition temperatures are observed, the combination of the thermoplastic resins can be judged to be incompatible.

Examples of preferred combinations of crystalline resins include polyamide and polypropylene, polylactic acid and polypropylene, polyphenylene sulfide and polypropylene, polyester and polypropylene, polyamide and polymethylpentene, polyester and polymethylpentene, polyphenylene sulfide and polymethylpentene, polylactic acid and polymethylpentene, and polypropylene and polymethylpentene.

The polyamide described above is a resin made of a polymer having an amide bond and is produced using amino acid, lactam, or diamine, and dicarboxylic acid as main material. Representative examples the material include amino acids such as 6-aminocaproic acid, 11-aminoundecanoic acid, 12-aminododecanoic acid, and p-aminomethyl benzoic acid; lactams such as ε-caprolactam and ω-laurolactam; aliphatic, alicyclic, and aromatic diamines such as tetramethylenediamine, pentamethylenediamine, hexamethylenediamine, 2-methylpentamethylene-diamine, undecamethylenediamine, dodecamethylenediamine, 2,2,4-/2,4,4-trimethylhexamethylenediamine, 5-methylnonamethylenediamine, m-xylenediamine, p-xylylenediamine, 1,3-bis(aminomethyl)cyclohexane, 1,4-bis(aminomethyl)cyclohexane, 1-amino-3-aminomethyl-3,5,5-trimethylcyclohexane, bis(4-aminocyclohexyl)methane, bis(3-methyl-4-aminocyclohexyl)methane, 2,2-bis(4-aminocyclohexyl)propane, bis(aminopropyl)piperazine, and aminoethylpiperazine; and aliphatic, alicyclic, and aromatic dicarboxylic acids such as adipic acid, suberic acid, azelaic acid, sebacic acid, dodecanedioic acid, terephthalic acid, isophthalic acid, 2-chloro-terephthalic acid, 2-methylterephthalic acid, 5-methylisophthalic acid, 5-sodium sulfoisophthalic acid, hexahydroterephthalic acid, and hexahydroisophthalic acid. Polyamide homopolymers or copolymers derived from these materials can be used alone or in the form of a mixture.

Specific examples of particularly useful polyamides include polycaproamide (nylon 6), polyhexamethylene adipamide (nylon 66), polypentamethylene adipamide (nylon 56), polytetramethylene adipamide (nylon 46), polyhexamethylene sebacamide (nylon 610), polypentamethylene sebacamide (nylon 510), polyhexamethylene dodecamide (nylon 612), polyundecane amide (nylon 11), polydodecane amide (nylon 12), polycaproamide/polyhexamethylene terephthalamide copolymer (nylon 6/6T), polyhexamethylene adipamide/polyhexamethylene terephthalamide copolymer (nylon 66/6T), polyhexamethylene adipamide/polyhexamethylene isophthalamide copolymer (nylon 66/6I), polyhexamethylene adipamide/polyhexamethylene isophthalamide/polycaproamide copolymer (nylon 66/6I/6), polyhexamethylene terephthalamide/polyhexamethylene isophthalamide copolymer (nylon 6T/6I), polyhexamethylene terephthalamide/polydodecane amide copolymer (nylon 6T/12), polyhexamethylene adipamide/polyhexamethylene terephthalamide/polyhexamethylene isophthalamide copolymer (nylon 66/6T/6I), polyxylylene adipamide (nylon XD6), polyhexamethylene terephthalamide/poly-2-methylpentamethylene terephthalamide copolymer (nylon 6T/M5T), polyhexamethylene terephthalamide/polypentamethylene terephthalamide copolymer (nylon 6T/5T), and mixtures and copolymers thereof.

Particularly preferred examples thereof include polyamide 6, polyamide 66, polyamide 610, polyamide 11, polyamide 12, polyamide 6/66 copolymer, and polyamide 6/12 copolymer. Further, it is practically suitable to use these polyamides as a mixture depending on the required properties such as moldability, heat resistance, and mechanical properties, and polyamide 6, polyamide 66, polyamide 610, polyamide 11, and polyamide 12 are most preferred among them.

The degree of polymerization of these polyamides is not critical, and it is preferable to use a polyamide having a relative viscosity of 1.5 to 7.0, particularly preferably a relative viscosity of 1.8 to 6.0, as measured at 25° C. in a 98% concentrated sulfuric acid solution with a sample concentration of 0.01 g/ml. When the relative viscosity is in the preferred range above, excellent shock absorption, a characteristic of the thermoplastic resin composition, can be readily exhibited, and molded articles are easily formed because the thermoplastic resin composition has a moderate melt viscosity.

Examples of the polyester described above include polymers and copolymers obtained by condensation reaction using a dicarboxylic acid (or an ester-forming derivative thereof) and a diol (or an ester-forming derivative thereof) as principal components, and mixtures thereof.

Examples of the dicarboxylic acid described above include aromatic dicarboxylic acids such as terephthalic acid, isophthalic acid, phthalic acid, 2,6-naphthalene dicarboxylic acid, 1,5-naphthalene dicarboxylic acid, bis(p-carboxyphenyl) methane, anthracene dicarboxylic acid, 4,4'-diphenyl ether dicarboxylic acid, and 5-sodium sulfoisophthalic acid; aliphatic dicarboxylic acids such as adipic acid, sebacic acid, azelaic acid, and dodecanedioic acid; alicyclic dicarboxylic acids such as 1,3-cyclohexanedicarboxylic acid and 1,4-cyclohexanedicarboxylic acid; and ester-forming derivatives thereof. Examples of diol components include $C_2$-$C_{20}$ aliphatic glycols, i.e., ethylene glycol, propylene glycol, 1,4-butanediol, neopentyl glycol, 1,5-pentanediol, 1,6-hexanediol, decamethylene glycol, cyclohexanedimethanol, cyclohexanediol, and the like; long-chain glycols with a molecular weight of 400 to 6,000, i.e., polyethylene glycol, poly-1,3-propylene glycol, polytetramethylene glycol, and the like; and ester-forming derivatives thereof.

Preferred examples of polymers or copolymers made of such components include polybutylene terephthalate, polybutylene (terephthalate/isophthalate), polybutylene (terephthalate/adipate), polybutylene (terephthalate/sebacate), polybutylene (terephthalate/decanedicarboxylate), polybutylene naphthalate, polyethylene terephthalate, polyethylene (terephthalate/isophthalate), polyethylene (terephthalate/adipate), polyethylene (terephthalate/5-sodium sulfoisophthalate), polybutylene (terephthalate/5-sodium sulfoisophthalate), polyethylene naphthalate, and polycyclohexanedimethylene terephthalate. In terms of moldability of a polyester composition, polybutylene terephthalate, polybutylene (terephthalate/adipate), polybutylene (terephthalate/decanedicarboxylate), polybutylene naphthalate, polyethylene terephthalate, polyethylene (terephthalate/adipate), polyethylene naphthalate, polycyclohexanedimethylene terephthalate, and the like are particularly preferred, and polyethylene terephthalate and polybutylene terephthalate are most preferred.

For these polyesters, in terms of mechanical properties and moldability, those which have an intrinsic viscosity in the range of 0.36 to 1.60 dl/g, particularly 0.52 to 1.35 dl/g, when an o-chlorophenol solution is measured at 25° C. are preferred.

As the polyphenylene sulfide described above, a polymer having a repeating unit represented by the following structural formula can preferably be used:

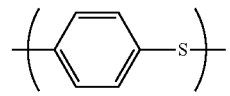

From the standpoint of heat resistance, it is preferable to use a polymer comprising the repeating unit represented by the structural formula above in an amount of 70 mol % or more, and more preferably 90 mol % or more. In the polyphenylene sulfide, less than about 30 mol % of repeating units may be constituted, for example, by repeating units having any of the structures described below. In particular, p-phenylene sulfide/m-phenylene sulfide copolymer (m-phenylene sulfide unit: 20% or less) is preferably used because it has both molding processability and barrier properties.

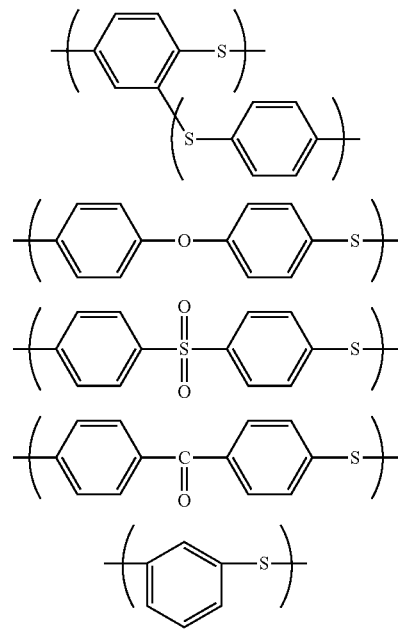

-continued

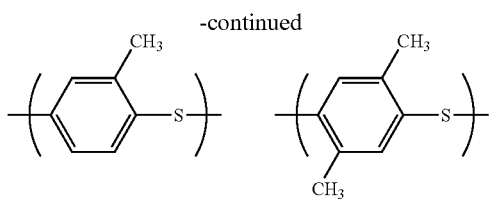

Polyphenylene sulfide can be produced in high yield by recovering and post-treating a polyphenylene sulfide resin obtained by reacting a polyhalogenated aromatic compound with a sulfidizing agent in a polar organic solvent. Specifically, polyphenylene sulfide can also be produced by the method of obtaining a polymer with a relatively small molecular weight described in JP 45-3368 B, the method of obtaining a polymer with a relatively large molecular weight described in JP 52-12240 B and JP 61-7332 A, or the like. The polyphenylene sulfide obtained by the above methods can also be used after being subjected to various treatments such as cross-linking/increase in molecular weight by heating in air; heat treatment in an atmosphere of inert gas such as nitrogen or under reduced pressure; washing with an organic solvent, hot water, an aqueous acid solution, or the like; and activation with acid anhydride, amine, isocyanate, or a functional group-containing compound such as a functional group-containing disulfide compound.

Specific examples of the method of the cross-linking/increase in molecular weight of polyphenylene sulfide by heating include heating polyphenylene sulfide in a heating vessel at a predetermined temperature in an atmosphere of oxidizing gas such as air or oxygen or in an atmosphere of mixed gas of the oxidizing gas and inert gas such as nitrogen or argon until achieving a desired melt viscosity. The heating temperature generally selected is 170 to 280° C., and preferably 200 to 270° C. The heating time generally selected is 0.5 to 100 hr, and preferably 2 to 50 hr. By controlling these two conditions, a target viscosity level can be achieved. The apparatus for the heat treatment may be an ordinary hot-air dryer, a rotary heater, or a heater equipped with a stirring blade, but, for an efficient and more uniform treatment, it is preferable to use a rotary heater or a heater equipped with a stirring blade.

Specific examples of the method of heat-treating polyphenylene sulfide in an atmosphere of inert gas such as nitrogen or under reduced pressure include heat-treating polyphenylene sulfide in an atmosphere of inert gas such as nitrogen or under reduced pressure at a heating temperature of 150 to 280° C., preferably 200 to 270° C., for a heating time of 0.5 to 100 hr, preferably 2 to 50 hr. The apparatus for the heat treatment may be an ordinary hot-air dryer, a rotary heater, or a heater equipped with a stirring blade, but, for an efficient and more uniform treatment, it is preferable to use a rotary heater or a heater equipped with a stirring blade.

The polyphenylene sulfide is preferably a polyphenylene sulfide subjected to washing. Specific examples of the method of washing include washing with an aqueous acid solution, washing with hot water, and washing with an organic solvent. Two or more of these methods may be used in combination.

Specific examples of the method of washing polyphenylene sulfide with an organic solvent include the following method. Any organic solvent may be used for washing as long as it does not decompose polyphenylene sulfide, and examples thereof include nitrogen-containing polar solvents such as N-methylpyrrolidone, dimethylformamide, and dimethylacetamide; sulfoxide solvents and sulfone solvents such as dimethyl sulfoxide and dimethyl sulfone; ketone solvents such as acetone, methyl ethyl ketone, diethyl ketone, and acetophenone; ether solvents such as dimethyl ether, dipropyl ether, and tetrahydrofuran; halogen solvents such as chloroform, methylene chloride, trichloroethylene, ethylene dichloride, dichloroethane, tetrachloroethane, and chlorobenzene; alcohol solvents and phenol solvents such as methanol, ethanol, propanol, butanol, pentanol, ethylene glycol, propylene glycol, phenol, cresol, and polyethylene glycol; and aromatic hydrocarbon solvents such as benzene, toluene, and xylenes. Among these organic solvents, N-methylpyrrolidone, acetone, dimethylformamide, chloroform, and the like are preferably used. These organic solvents are used alone or as a mixture of two or more thereof. Examples of the method of washing with an organic solvent include immersing polyphenylene sulfide in an organic solvent, and stirring or heating may be performed as appropriate. The washing temperature in washing polyphenylene sulfide with an organic solvent is not critical, and any temperature from normal temperature to about 300° C. can be selected. The higher the washing temperature is, the higher the washing efficiency tends to be, but, in general, a washing temperature from normal temperature to 150° C. produces a sufficient effect. The polyphenylene sulfide washed with an organic solvent is preferably washed with water or warm water for several times to remove the residual organic solvent.

Specific examples of the method of washing polyphenylene sulfide with hot water include the following method. To express the preferred effect of chemical denaturation of polyphenylene sulfide by hot water washing, the water used is preferably distilled water or deionized water. The operation of the hot-water treatment is generally carried out such that a given amount of polyphenylene sulfide is injected into a given amount of water, and the resultant is heated and stirred under normal pressure or in a pressure container. For the ratio of polyphenylene sulfide to water, the ratio of water is preferably larger, and, in general, a bath ratio of polyphenylene sulfide (200 g or less) to water (1 liter) is selected.

In washing with hot water, treating with an aqueous solution containing a metal element of Group II of the periodic table is preferably used. The aqueous solution containing a metal element of Group II of the periodic table is a solution obtained by adding a water-soluble salt having a metal element of Group II of the periodic table to the water described above. The concentration of the water-soluble salt having a metal element of Group II of the periodic table in the water is preferably 0.001 to about 5% by weight.

Examples of preferred metal elements among the metal elements of Group II of the periodic table used include Ca, Mg, Ba, and Zn, and examples of anions include acetate ion, halide ion, hydroxide ion, and carbonate ion. Examples of more specific and preferred compounds include Ca acetate, Mg acetate, Zn acetate, $CaCl_2$, $CaBr_2$, $ZnCl_2$, $CaCO_3$, $Ca(OH)_2$, and CaO, and Ca acetate is particularly preferred.

The temperature of the aqueous solution containing a metal element of Group II of the periodic table is preferably 130° C. or higher, and more preferably 150° C. or higher. The upper limit of the washing temperature is not particularly limited, but when using a normal autoclave, the limit is generally about 250° C.

The bath ratio of the aqueous solution containing a metal element of Group II of the periodic table is preferably 2 to 100, more preferably 4 to 50, and still more preferably 5 to 15, to dry polymer 1 in weight ratio.

Specific examples of the method of washing polyphenylene sulfide with an aqueous acid solution include the following method, i.e., immersing polyphenylene sulfide in acid or an aqueous solution of acid, and stirring or heating may be performed as appropriate. Any acid may be used as long as it does not decompose polyphenylene sulfide, and examples thereof include aliphatic saturated monocarboxylic acids such as formic acid, acetic acid, propionic acid, and butyric acid; halo-substituted aliphatic saturated carboxylic acids such as chloroacetic acid and dichloroacetic acid; aliphatic unsaturated monocarboxylic acids such as acrylic acid and crotonic acid; aromatic carboxylic acids such as benzoic acid and salicylic acid; dicarboxylic acids such as oxalic acid, malonic acid, succinic acid, phthalic acid, and fumaric acid; and inorganic acidic compounds such as sulfuric acid, phosphoric acid, hydrochloric acid, carbonic acid, and silicic acid. Among them, acetic acid and hydrochloric acid are more preferably used. The polyphenylene sulfide treated with acid is preferably washed with water or warm water for several times to remove the residual acid, residual salt, and the like. The water used for washing is preferably distilled water or deionized water not to impair the preferred effect of chemical denaturation of polyphenylene sulfide by acid treatment.

To provide properties such as fluidity during processing and molding cycle, the ash content of the polyphenylene sulfide is preferably 0.1 to 2% by weight, more preferably 0.2 to 1% by weight, and still more preferably 0.3 to 0.8% by weight.

"Ash content" as used herein refers to the content of inorganic components in polyphenylene sulfide determined by the following method:

(1) Into a platinum dish calcined at 583° C. and cooled, 5 to 6 g of polyphenylene sulfide is weighed.
(2) Together with the platinum dish, the polyphenylene sulfide is precalcined at 450 to 500° C.
(3) The polyphenylene sulfide sample precalcined together with the platinum dish is placed into a muffle furnace set at 583° C. and calcined for about 6 hr until complete ashing.
(4) The ash is cooled in a desiccator and weighed.
(5) The ash content is calculated using Equation: ash content (% by weight)=(ash weight (g)/sample weight (g))× 100.

To improve chemical resistance and provide properties such as fluidity during processing, the melt viscosity of the polyphenylene sulfide is preferably selected to be 1 to 2,000 Pa·s (300° C., shear rate 1,000 sec$^{-1}$), more preferably 1 to 200 Pa·s, and still more preferably 1 to 50 Pa·s. The melt viscosity is a value measured with a Koka-type flow tester using a nozzle with a nozzle diameter of 0.5 mm φ and a nozzle length of 10 mm under conditions at a shear rate of 1,000 sec$^{-1}$.

To improve chemical resistance and provide properties such as fluidity during processing, chloroform extractability (calculated from the residual after Soxhlet extraction (polymer 10 g/chloroform 200 mL) for 5 hr), an index of the amount of organic low polymer (oligomer) of the polyphenylene sulfide, is preferably in a relatively large range of 1 to 5% by weight, more preferably 1.5 to 4% by weight, and still more preferably 2 to 4% by weight.

The polylactic acid described above is a polymer mainly composed of L-lactic acid and/or D-lactic acid, but copolymer components other than lactic acid may be contained as desired. Specific examples of other copolymer component units include polycarboxylic acids, polyhydric alcohols, hydroxycarboxylic acids, and lactones. Specifically, for example, polycarboxylic acids such as oxalic acid, malonic acid, succinic acid, glutaric acid, adipic acid, azelaic acid, sebacic acid, dodecanedioic acid, fumaric acid, cyclohexanedicarboxylic acid, terephthalic acid, isophthalic acid, phthalic acid, 2,6-naphthalene dicarboxylic acid, 5-sodium sulfoisophthalic acid, and 5-tetrabutylphosphonium sulfoisophthalic acid; polyhydric alcohols such as ethylene glycol, propylene glycol, butanediol, heptanediol, hexanediol, octanediol, nonanediol, decanediol, 1,4-cyclohexanedimethanol, neopentyl glycol, glycerin, trimethylolpropane, pentaerythritol, bisphenol A, aromatic polyhydric alcohols obtained by addition reaction of bisphenol and ethylene oxide, diethylene glycol, triethylene glycol, polyethylene glycol, polypropylene glycol, and polytetramethylene glycol; hydroxycarboxylic acids such as glycolic acid, 3-hydroxy butyric acid, 4-hydroxy butyric acid, 4-hydroxy valeric acid, 6-hydroxy caproic acid, and hydroxybenzoic acid; and lactones such as glycolide, ε-caprolactone glycolide, ε-caprolactone, β-propiolactone, δ-butyrolactone, β- or γ-butyrolactone, pivalolactone, and δ-valerolactone can be used. These copolymer components can be used alone or in combination of two or more thereof.

To provide high heat resistance using polylactic acid, the optical purity of lactic acid component is preferably higher, and in the total lactic acid component, it is preferred that L-isomers or D-isomers be contained in an amount of 80 mol % or more, more preferably 90 mol % or more, and particularly preferably 95 mol % or more.

To produce polylactic acid, a known polymerization method can be used, and, for example, direct polymerization from lactic acid, ring-opening polymerization through lactide formation, and the like can be employed. The molecular weight and molecular weight distribution of the polylactic acid is not critical as long as it actually can be processed by molding, and the weight average molecular weight is preferably 10,000 or more, more preferably 40,000 or more, and particularly preferably 80,000 or more. The weight average molecular weight as used herein is a polymethyl methacrylate (PMMA) equivalent weight average molecular weight measured by gel permeation chromatography (GPC) using hexafluoroisopropanol as solvent.

As the polypropylene described above, those which are commonly used for molding material use, for example, polypropylene homopolymer, random or block copolymer of propylene and ethylene and/or α-olefin, e.g., ethylene-propylene random copolymer, ethylene-propylene block copolymer, and the like can be used. In the case of polypropylene homopolymer, any of isotactic, atactic, and syndiotactic polypropylene homopolymer can be used. The polypropylene may be used alone, or two or more polypropylenes may be used in combination.

The polypropylene preferably comprises a modified polypropylene modified by α,β-unsaturated carboxylic acid or a derivative thereof to improve compatibility with other crystalline resins, whereby particles dispersed in a polymer alloy can be controlled more uniformly and finely. Examples of α,β-unsaturated carboxylic acids or derivatives thereof used here include acrylic acid, methacrylic acid, maleic acid, itaconic acid, citraconic acid, himic acid, bicyclo(2,2,2)oct-5-ene-2,3-dicarboxylic acid, 1,2,3,4,5,8,9,10-octahydronaphthalene-2,3-dicarboxylic acid, bicyclo(2,2,1)oct-7-ene-2,3,5,6-tetradicarboxylic acid, and 7-oxabicyclo(2,2,1) hept-5-ene-2,3-dicarboxylic acid. Examples of derivatives of unsaturated carboxylic acid include acid anhydrides, esters, amides, imides, and metal salts: e.g., maleic anhydride, itaconic anhydride, citraconic anhydride, himic anhydride, maleic acid monomethyl ester, fumaric acid monomethyl ester, dimethylaminoethyl methacrylate, dimethylaminopropyl acrylamide, acrylamide, methacrylamide, maleic acid monoamide, maleic acid diamide, maleic acid-N,N-diethyl amide, maleic acid-N-monobutylamide, maleic acid-N,N-dibutylamide, fumaric acid-N,N-dibutylamide, maleimide, N-butylmaleimide, N-phenylmaleimide, sodium acrylate, sodium methacrylate, and potassium acrylate. These unsaturated carboxylic acids or derivatives thereof can also be used in combination of two or more thereof. Maleic anhydride is preferably used.

As the polymethylpentene described above, a polymer mainly composed of 4-methylpentene-1 can be used, wherein 4-methylpentene-1 obtained by dimerization of propylene accounts for 70 mol % or more of all the components, and less than 30 mol % of other components are copolymerized or graft-polymerized as required. Polymethylpentene particularly useful is a homopolymer of 4-methylpentene-1 and a copolymer of 4-methylpentene-1 with less than 30 mol % of ethylene, propylene, butene-1, hexene-1, isobutylene, and styrene.

The polymethylpentene preferably comprises a modified polymethylpentene modified by α,β-unsaturated carboxylic acid or a derivative thereof to improve compatibility with other crystalline resins, whereby particles dispersed in a polymer alloy can be controlled more uniformly and finely. Examples of α,β-unsaturated carboxylic acids or derivatives thereof used here include acrylic acid, methacrylic acid, maleic acid, itaconic acid, citraconic acid, himic acid, bicyclo (2,2,2)oct-5-ene-2,3-dicarboxylic acid, 1,2,3,4,5,8,9,10-octahydronaphthalene-2,3-dicarboxylic acid, bicyclo(2,2,1) oct-7-ene-2,3,5,6-tetradicarboxylic acid, and 7-oxabicyclo (2,2,1)hept-5-ene-2,3-dicarboxylic acid. Examples of derivatives of unsaturated carboxylic acid include acid anhydrides, esters, amides, imides, and metal salts: e.g., maleic anhydride, itaconic anhydride, citraconic anhydride, himic anhydride, maleic acid monomethyl ester, fumaric acid monomethyl ester, dimethylaminoethyl methacrylate, dimethylaminopropyl acrylamide, acrylamide, methacrylamide, maleic acid monoamide, maleic acid diamide, maleic acid-N,N-diethyl amide, maleic acid-N-monobutylamide, maleic acid-N,N-dibutylamide, fumaric acid-N,N-dibutylamide, maleimide, N-butylmaleimide, N-phenylmaleimide, sodium acrylate, sodium methacrylate, and potassium acrylate. These unsaturated carboxylic acids or derivatives thereof can also be used in combination of two or more thereof. Maleic anhydride is preferably used.

A composition of two or more crystalline resins is not critical, but the weight ratio of a largest-amount component (A) to a second-largest-amount component (B) in a resin composition ((A)/(B)) is preferably 90/10 to 50/50, more preferably 85/25 to 50/50, and particularly preferably 80/20 to 50/50.

The polymer alloy will now be described.

We provide a polymer alloy obtainable by melt-kneading at least two incompatible crystalline resins, which has such a dispersed structure that particles dispersed in the polymer alloy have an average particle size of 0.001 to 1 μm, wherein in scattering measurement, (a) a peak half-width in a spectrum obtained by plotting scattering intensity against the wavenumber of scattered light and (b) a maximum wavenumber of the peak satisfy: $0<(a)/(b)\leq 1.5$.

Polymer alloy exhibits excellent properties compared to those of a single resin by bringing out the advantages of each material resin and compensating the disadvantages each other. What is important here is the size and uniformity of particles in a dispersed structure. In the polymer alloy, the average particle size of dispersed particles in a dispersed structure is 0.001 μm to 1 μm. When the dispersed particles have an average particle size of more than 1 μm, physical properties of each material are only expressed, and it is difficult to compensate the disadvantages each other. When the dispersed particles in a dispersed structure have an average particle size of less than 0.001 μm, properties of the material resins will be lost. The average particle size of the dispersed particles is preferably 0.001 μm to 0.9 μm, and more preferably 0.001 μm to 0.75 μm.

"Average particle size" as used herein refers to a number average particle size of major axis determined from an electron micrograph, and can be determined by image analysis. Alternatively, the major axes of 50 particles can be measured directly from a micrograph to determine the number average value.

The average particle size can be determined by observing a sample cut out from, for example, a pellet, a press-molded article, a film, a sheet, or an injection-molded article using a light microscope or a transmission electron microscope.

In melt-kneading, by performing chaotic mixing in which alloy components are stretched and folded repeatedly, dispersed phase of two or more incompatible polymer alloys are miniaturized. Further, for phase structure, such a characteristic dispersed structure with highly controlled uniformity that the particles dispersed in the polymer alloy have an average particle size of 0.001 to 1 μm can be obtained.

Even when the average particle size is 0.001 to 1 μm, if there are structurally coarse portions in part, properties intrinsic to the polymer alloy may not be obtained. For example, when subjected to impact, destruction proceeds starting from that point. Thus, the uniformity of the particles dispersed in the polymer alloy is important. The uniformity can be evaluated by small-angle X-ray scattering measurement in the case of a polymer alloy with an average particle size of 0.001 μm to less than 0.1 μm and by light scattering measurement in the case of a polymer alloy with an average particle size of 0.1 μm to 1 μm. Small-angle X-ray scattering and light scattering differ from each other in analyzable dispersed structure size. Therefore, it is necessary to use them appropriately depending on the dispersed structure size of a polymer alloy to be analyzed. The small-angle X-ray scattering measurement and the light scattering measurement provide information on distribution. Specifically, the broadening type of a scattering maximum peak in a spectrum obtained by these measurements corresponds to uniformity of particle size.

As an index of uniformity, we paid attention to the half-width of a scattering maximum peak in a spectrum obtained by plotting scattering intensity against the wavenumber of scattered light using small-angle X-ray scattering measurement in the case of a polymer alloy with an average particle size of 0.001 μm to less than 0.1 μm and light scattering measurement in the case of a polymer alloy with an average particle size of 0.1 μm to 1 μm. Since the half-width of a peak tends to increase as the wavenumber of the peak maximum increases, the value (a)/(b) calculated from the half-width of a peak (a) and the wavenumber of the peak maximum (b) is employed as an index of uniformity of particle size. To exhibit excellent physical properties such as mechanical properties, uniformity of particle size is preferably higher.

In the polymer alloy, in scattering measurement, (a) a peak half-width in a spectrum obtained by plotting scattering intensity against the wavenumber of scattered light and (b) a maximum wavenumber of the peak satisfy the relationship: $0<(a)/(b)\leq 1.5$. When (a)/(b) is more than 1.5, uniformity of particle size is low, resulting in a low improving effect on heat resistance, wet-heat resistance, and mechanical properties, and when (a)/(b) is 0 (i.e., there is no peak), there is no uniformity of particle size, resulting in a low improving effect on heat resistance, wet-heat resistance, and mechanical properties, both of which are problematic.

(a)/(b) preferably satisfies 0<(a)/(b)≤1.4, and more preferably 0<(a)/(b)≤1.3.

The half-width of a peak is a width of a peak at a midpoint (point C) of a line segment connecting (point A) and (point B), wherein (point A) is the apex of the peak, and (point B) is an intersection of a straight line drawn from (point A) parallel to the ordinate of the graph and the baseline of the spectrum. The width of a peak means a width of a straight line that is parallel to the baseline and passes through (point C).

In the light scattering measurement and small-angle X-ray diffraction measurement, a sample needs to be in the form of a thin film. A thin film can be formed by hot-press or cutting-out of a section using, for example, a microtome. In the case of a light scattering apparatus, a sample in the form of a thin film can be easily obtained by sandwiching a polymer alloy between cover glasses with a thickness of about 0.1 mm and carrying out hot-press. In the case of small-angle X-ray diffraction, care should be taken because a cover glass can absorb X-rays. When carrying out hot-press, it is necessary to determine pressing conditions carefully because the structure of some samples can be coarse if heat is applied excessively or pressing time is long. Further, in the case of a crystalline resin, the alloy structure can change due to crystallization, and thus quenching needs to be performed immediately after hot-press to fix the structure.

For a sample prepared in the form of a thin film, measurements are made at its central part. When the sample is too large relative to the size of a sample holder of a measuring apparatus, the central part is cut out from the sample for measurements. The sample thickness is adjusted to be an optimum thickness by layering multiple samples to obtain as high signal intensity as possible. The signal intensity increases in proportion to the sample thickness. However, the absorption of measuring light also increases exponentially with the sample thickness according to the Lanbert-Beer law and, accordingly, the signal intensity decreases. Therefore, the sample thickness needs to be determined in accordance with the balance between them.

Further, a polymer alloy comprising a combination of polymers with a small refractive index difference is difficult to be measured because of low signal intensity. In such a case, it is also effective to carry out treatment with a dye reagent such as iodine, $RuO_4$, or $OsO_4$ as required.

To the polymer alloy used in the process of producing a polymer alloy, various additives can be further added as desired. Further, to the polymer alloy itself, various additives can be further added as desired.

Examples of such additives include reinforcing materials and non-plate-like fillers such as talc, kaolin, mica, clay, bentonite, sericite, basic magnesium carbonate, glass flakes, glass fibers, carbon fibers, asbestos fibers, rock wool, silica sand, wollastonite, and glass beads; antioxidants (e.g., phosphorus-type and sulfur-type); UV absorbers; heat stabilizers (e.g., hindered phenol-type); transesterification inhibitors; inorganic crystal nucleating agents (e.g., talc); organic crystal nucleating agents (e.g., sorbitol derivatives and aliphatic carboxylic acid amides); lubricants; releasing agents; antistatic agents; antiblocking agents; coloring agents including dyes and pigments; flame retardants (e.g., halogen-type and phosphorus-type); flame retardant adjuvants (e.g., antimony compounds represented by antimony trioxide, zirconium oxide, and molybdenum oxide); foaming agents; coupling agents (silane coupling agents and titanium coupling agents containing at least one of epoxy group, amino group, mercapto group, vinyl group, and isocyanate group); and anti-bacterial agents.

The polymer alloy can be molded into a molded article. Preferred molding methods are injection molding method, film forming method, sheet forming method, inflation molding method, and blow molding method, and particularly preferred are injection molding method, film forming method, and sheet forming method. A molded article made of the polymer alloy is, for example, an injection-molded article, a film, and a sheet. Further, it is also preferred that the molded article made of the polymer alloy be a molded article obtained by laminating films or sheets and carrying out post-processing such as corrugation or surface coating.

The molded article can be suitably used in various applications such as automotive parts, electrical and electronic parts, and packaging materials because it has very excellent heat resistance, wet-heat resistance, and mechanical properties.

EXAMPLES

Our methods, polymer alloys and molded articles will now be described by way of example. In the Examples and Comparative Examples, measurements were made by the following methods.

Transmission Electron Micrograph

For a sample obtained by cutting out an ultrathin section using an ultramicrotome, the phase structure was observed using a transmission electron microscope, Model H-7100 manufactured by Hitachi Ltd., under 10,000× magnification.

ln $L/L_0$ Determined by Particle Tracking Method

Using SCREWFLOW-MULTI manufactured by Japan Steel Works, LTD., a CAE analysis software for inside an extruder, the initial positions of 1,000 particles were randomly determined at t (time)=0 in a cross-section upstream of a screw, and movement associated with the velocity field determined by analysis of the screw to be evaluated was tracked by simulation. From the record of coordinates of each particle at each kneading temperature, the logarithm of the extension of an imaginary line (ln $L/L_0$), wherein L is a lineal length, and $L_0$ is an initial lineal length, was determined.

(a)/(b) Measured from Light Scattering Spectrum, Configuration of Phase Structure A polymer alloy was sandwiched between cover glasses with a thickness of 0.1 mm and hot-pressed to prepare a sample in the form of a thin film, and light scattering measurements were made with the sample being sandwiched between the cover glasses. For the light scattering, based on one-dimensional data obtained by exposure in a CCD camera for 1 min using DYNA-300 manufactured by OTSUKA ELECTRONICS CO., LTD., the wavenumber was plotted on the abscissa, and the scattering intensity on the ordinate. (a)/(b) was determined from the peak half-width (a) and the wavenumber of the peak maximum in this plot. Schematic views of the phase structure are shown in FIG. 1. In Tables, the configurations of the phase structure observed in Examples and Comparative Examples are shown as (a) or (b) of FIG. 1. For example, in Example 1, it is shown that the phase structure was a configuration of FIG. 1 (a).

Heat Resistance (DTUL) Test

In accordance with ASTM D648, deflection temperature under load was measured at a temperature rise rate of 120° C./hr under a load of 0.46 MPa using 148-HDD-6S manufactured by Yasuda Seiki seisakusho LTD.

Tensile Elongation

In accordance with ASTM D638, an ASTM-1 dumbbell test piece with a thickness of ⅛ inch (3.175 mm) was measured in an atmosphere of 23° C. and 50% RH at a gauge length of 100 mm and a tensile speed of 10 mm/min using UTA-2.5T manufactured by ORIENTEC Co., LTD.

Shock Resistance

In accordance with ASTM D256, a notched Izod impact test was performed. The thickness of the test piece used was 3.2 mm, and the test was carried out in an atmosphere of 23° C. and 50% RH. The average value of seven measurements was used to evaluate the shock resistance.

Flexural Modulus

In accordance with ASTM D790, the flexural modulus of a flexural test piece with a thickness of ⅛ inch (3.175 mm) was evaluated in an atmosphere of 23° C. and 50% RH using RTA-1T manufactured by ORIENTEC Co., LTD.

Tensile Strength, Tensile Elongation, Tensile Modulus

A polymer alloy was hot-pressed for 10 sec at 1.5 MPa to produce a sheet (thickness: 0.3 mm). A sample of length×width×thickness=50 mm×10 mm×0.3 mm was cut out from the sheet, and measurements were made at a chuck distance of 20 mm and a tensile speed of 100 mm/min using UTA-2.5T manufactured by ORIENTEC Co., LTD.

Wet-Heat Resistance (Flexural Modulus)

In accordance with ASTM D790, a flexural test piece with a thickness of ⅛ inch (3.175 mm) was treated in a thermohygrostat at a temperature of 60° C. and a relative humidity of 95% for 24 hr, and then the flexural modulus was evaluated in an atmosphere of 23° C. and 50% RH using RTA-1T manufactured by ORIENTEC Co., LTD.

Wet-Heat Resistance (Tensile Elongation)

A polymer alloy was hot-pressed for 10 sec at 1.5 MPa to produce a sheet (thickness: 0.3 mm). A sample of length×width×thickness=50 mm×10 mm×0.3 mm was cut out from the sheet. The sample obtained was treated in a thermohygrostat at a temperature of 120° C. and a relative humidity of 100% for 24 hr, and then measurements were made at a chuck distance of 20 mm and a tensile speed of 100 mm/min using UTA-2.5T manufactured by ORIENTEC Co., LTD.

Wet-Heat Resistance (Tensile Strength)

A polymer alloy was hot-pressed for 10 sec at 1.5 MPa to produce a sheet (thickness: 0.3 mm). A sample of length×width×thickness=50 mm×10 mm×0.3 mm was cut out from the sheet. The sample obtained was treated in a thermohygrostat at a temperature of 120° C. and a relative humidity of 100% for 24 hr, and then measurements were made at a chuck distance of 20 mm and a tensile speed of 100 mm/min using UTA-2.5T manufactured by ORIENTEC Co., LTD.

In the Examples and Comparative Examples, the resins shown below were used:

PA-1: Nylon 6 ("AMILAN" CM1001 available from TORAY INDUSTRIES, INC.), melting point: 225° C., glass transition temperature: 47° C.

PA-2: Nylon 610 ("AMILAN" CM2001 available from TORAY INDUSTRIES, INC.), melting point: 225° C., glass transition temperature: 40° C.

PP-1: Polypropylene ("Prime Polypro" J108M available from Prime Polymer Co., Ltd.), melting point: 165° C., glass transition temperature: −20° C.

PP-2: Polypropylene ("Prime Polypro" E111G available from Prime Polymer Co., Ltd.), melting point: 165° C., glass transition temperature: −20° C.

Modified PP: Acid modified polypropylene ("Fusabond" P613 available from Du Pont), melting point: 162° C., glass transition temperature: −25° C.

PET: Polyethylene terephthalate (F20S available from TORAY INDUSTRIES, INC.), melting point: 264° C., glass transition temperature: 80° C., intrinsic viscosity: 0.65

PMP: Polymethylpentene ("TPX" DX820 available from Mitsui Chemicals, Inc.), melting point: 236° C., glass transition temperature: 30° C.

Modified PMP: Acid modified polymethylpentene ("TPX" MM-101B available from Mitsui Chemicals, Inc.), melting point: 232° C., glass transition temperature: 25° C.

As an inorganic filler, talc ("MICRO ACE" P-6 available from Nippon Talc Co., Ltd.) was used.

Chaotic Mixing Zone 1

In Examples 1 to 3, 5 to 7, 9 to 17, 19 to 20, and Comparative Examples 1 to 2, the chaotic mixing zone 1 is a zone where a twist kneading disc and a back-mixing screw are alternately arranged, the twist kneading disc comprising kneading discs having a helix angle θ in the range of 0°<θ<90° in the contra-rotating direction of the screw, the helix angle being an angle between the front apex and the rear apex of the disc, and the back-mixing screw comprising a flight screw in which a resin passageway is formed at the flight unit from the front end toward the rear end of the screw.

Chaotic Mixing Zone 2

In Example 4, 8, 18, and 21 to 22, the chaotic mixing zone 2 is a zone where a fractional-lob kneading block and a fractional mixing element are alternately arranged, the fractional-lob kneading block comprising kneading discs that are basically fractional-lob-shaped and have an eccentric shaft, and the fractional mixing element comprising rotors that are basically fractional-lob-shaped and have an eccentric shaft.

Examples 1 to 4, Comparative Examples 1 to 6

Raw materials of the composition shown in Table 1 were fed to a twin-screw extruder (TEX30XSSST manufactured by Japan Steel Works, LTD.) (L/D=45.5 (wherein L is the length from a raw material feed port to a discharge port)) set at a screw speed of 100 rpm, and the barrel temperature in the region from a polymer melting zone to a vent was controlled at the temperature shown in Table 1. The gut discharged from a die was immediately quenched in ice water to fix the structure and then pelletized with a strand cutter to obtain pellets. In Comparative Example 2, since the barrel temperature was low, the polymer was solidified during the melt-kneading and could not be melt-kneaded.

In Examples 1 to 3 and Comparative Examples 1 to 2, a screw configuration (A1 type) was used in which the zone where melt-kneading was performed while achieving chaotic mixing (chaotic mixing zone 1) was disposed over the whole area such that the percentage of the total length of the chaotic mixing zone 1 based on the full length of the extruder screw was 50%. In Example 4, a screw configuration (A2 type) was used in which the zone where melt-kneading was performed while achieving chaotic mixing (chaotic mixing zone 2) was disposed over the whole area such that the percentage of the total length of the chaotic mixing zone 2 based on the full length of the extruder screw was 50%. In Comparative Examples 3 to 6, as a screw configuration, a screw configuration (B type) was used in which usual kneading discs (L/D=3.8) were placed from the position of L/D=22, 28.

Using SCREWFLOW-MULTI manufactured by Japan Steel Works, LTD., a CAE analysis software for inside an extruder, the initial positions of 1,000 particles were randomly determined at t (time)=0 in a cross-section upstream of a screw, and movement associated with the velocity field determined by analysis of the screw to be evaluated was tracked by simulation. From the record of coordinates of each particle at each kneading temperature, the logarithm of the extension of an imaginary line ($\ln L/L_0$), wherein L is a lineal length, and $L_0$ is an initial lineal length, was determined, and the value of ($\ln L/L_0$) was shown in Table 1.

For samples obtained by cutting out ultrathin sections from the pellets described above, the state of the structure was observed with a transmission electron microscope under 10,000× magnification and all confirmed to be a dispersed structure. For the configuration of the phase structure, either of the configurations of the schematic view shown in FIG. 1 is shown in Table 1.

Further, 100 particles dispersed in the polymer alloy were randomly selected from the electron micrograph. The major axis of each particle was measured, and the number average value was calculated to determine the average particle size. The results are shown in Table 1.

Further, the polymer alloy was sandwiched between cover glasses with a thickness of 0.1 mm and hot-pressed at 230° C. for 10 sec to prepare a sample in the form of a thin film, and a light scattering spectrum was measured with the sample being sandwiched between the cover glasses. The half-width of a peak (a), the wavenumber of the peak maximum (b), and the value (a)/(b) in the spectrum are shown in Table 1.

Using an injection molding machine (SG-75H-MIV) manufactured by Sumitomo Heavy Industries, Ltd. set at 230° C.-235° C.-240° C.-240° C. from below a hopper toward the tip, the pellets described above were molded into the test piece described above at a mold temperature of 80° C. in a molding cycle of a dwell time of 12 sec and a cooling time of 18 sec. The test piece obtained was evaluated as described above, and the results are shown in Table 1.

TABLE 1

|  |  |  | Example 1 | Example 2 | Example 3 | Example 4 | Comparative Example 1 | Comparative Example 2 |
|---|---|---|---|---|---|---|---|---|
| Composition | PA-1 | Parts by Weight | 70 | 60 | 60 | 70 | 70 | 70 |
|  | PP-1 | Parts by Weight | 30 | 40 | 50 | 30 | 30 | 30 |
| Producing method | Melt-kneading Equipment |  | Twin-screw Extruder | | | | | |
|  | Screw arrange |  | A1 type | A1 type | A1 type | A2 type | A1 type | A1 type |
|  | Barrel setting temparature | ° C. | 175 | 175 | 175 | 175 | 117 | 240 |
|  | Difference between Barrel setting temparature at melt-kneading zone and Melting temperature of polyamide resin | ° C. | −50 | −50 | −50 | −50 | −108 | 15 |
|  | Difference between Barrel setting temparature at melt-kneading zone and Glass-transition temperature of polyamide resin | ° C. | 128 | 128 | 128 | 128 | 70 | 193 |
|  | In L/L₀ |  | 4.4 | 4.3 | 4.3 | 4.8 | immpossible to be melt-kneaded | 1.7 |
|  | Chaotic mixing |  | presence | presence | presence | presence | immpossible to be melt-kneaded | absence |
| Phase structure (pellets) | Structure |  | dispersed structure | dispersed structure | dispersed structure | dispersed structure |  | dispersed structure |
|  | Average Particle Size | μm | 0.61 | 0.63 | 0.71 | 0.50 |  | 18.45 |
|  | Peak half-width (a) | nm⁻¹ | 0.00219 | 0.00218 | 0.00192 | 0.00258 |  | absence of peak |
|  | Maximum wavelength of the peak (b) | nm⁻¹ | 0.00165 | 0.00160 | 0.00140 | 0.00200 |  |  |
|  | (a)/(b) |  | 1.33 | 1.36 | 1.37 | 1.29 |  |  |
|  | Configuration |  | a | a | a | a |  | b |
| Properties | Heat Resistance (DTUL) | ° C. | 191 | 181 | 172 | 193 | immpossible to be melt-kneaded | 185 |
|  | Tensile Elongation | % | 10.1 | 9.9 | 9.9 | 12.1 |  | 6 |
|  | Shock Resistance | J/m | 216 | 210 | 202 | 242 |  | 125 |
|  | Wet-Heat Resistance (Flexural modulus) | MPa | 1320 | 1420 | 1500 | 1410 |  | 840 |

|  |  |  | Comparative Example 3 | Comparative Example 4 | Comparative Example 5 | Comparative Example 6 |
|---|---|---|---|---|---|---|
| Composition | PA-1 | Parts by Weight | 70 | 70 | 60 | 50 |
|  | PP-1 | Parts by Weight | 30 | 30 | 40 | 50 |
| Producing method | Melt-kneading Equipment |  | Twin-screw Extruder | | | |
|  | Screw arrange |  | B type | B type | B type | B type |
|  | Barrel setting temparature | ° C. | 175 | 240 | 240 | 240 |
|  | Difference between Barrel setting temparature at melt-kneading zone and Melting temperature of polyamide resin | ° C. | 15 | 15 | 15 | 15 |
|  | Difference between Barrel setting temparature at melt-kneading zone and Glass-transition temperature of polyamide resin | ° C. | 193 | 193 | 193 | 193 |
|  | In L/L₀ |  | 1.6 | 1.4 | 1.3 | 1.3 |
|  | Chaotic mixing |  | absence | absence | absence | absence |
| Phase structure (pellets) | Structure |  | dispersed structure | dispersed structure | dispersed structure | dispersed structure |
|  | Average Particle Size | μm | 19.24 | 21.08 | 22.44 | 23.15 |
|  | Peak half-width (a) | nm⁻¹ | absence of peak | absence of peak | absence of peak | absence of peak |
|  | Maximum wavelength of the peak (b) | nm⁻¹ |  |  |  |  |
|  | (a)/(b) |  |  |  |  |  |
|  | Configuration |  | b | b | b | b |
| Properties | Heat Resistance (DTUL) | ° C. | 185 | 184 | 172 | 161 |
|  | Tensile Elongation | % | 5.7 | 5.5 | 5.5 | 5.4 |
|  | Shock Resistance | J/m | 120 | 117 | 110 | 101 |
|  | Wet-Heat Resistance (Flexural modulus) | MPa | 840 | 820 | 910 | 1030 |

Also in the case of a polymer alloy obtained by melt-kneading a combination of incompatible crystalline resins, by lowering the kneading temperature to a supercooled state and using the A1-type or A2-type screw configuration effective for creating a chaotically mixed state, a chaotic mixing in which ($\ln L/L_0$) determined from a lineal length (L) and an initial lineal length ($L_0$) was not less than 2 was achieved, and the value (a)/(b) calculated from a peak half-width (a) and a peak maximum wavelength (b) was not more than 1.5. Thus, a polymer alloy was obtained having a fine average particle size and in which the uniformity of the dispersed particles was high.

In Comparative Example 1, melt-kneading was attempted such that the A1-type screw configuration effective for creating a chaotically mixed state was used and the temperature in a kneading zone was set at a temperature 70° C. higher than the glass transition temperature of a resin having a highest glass transition temperature among the resins used. However, since the barrel temperature was low, the polymer was solidified during the melt-kneading and could not be melt-kneaded. In Comparative Example 2, melt-kneading was carried out such that the A1-type screw configuration effective to create a chaotically mixed state was used and the temperature in the kneading zone was set at a temperature 15° C. higher than the melting point of a resin having a highest melting point among the resins used. However, since the temperature in the kneading zone was high, a supercooled state was not achieved. Consequently, ($\ln L/L_0$) determined from a lineal length (L) and an initial lineal length ($L_0$) was not more than 2, which results in failing to create a chaotically mixed state, and the value (a)/(b) calculated from a peak half-width (a) and a peak maximum wavelength (b) was not less than 1.5. Thus, an average particle size of the polymer alloy was large, and an uniformity of the dispersed particles was not high. In Comparative Example 3, melt-kneading was carried out such that the B-type screw configuration in which usual kneading discs were placed was used and the temperature in the kneading zone was set at a temperature of 50° C. lower than the melting point of a resin having a highest melting point among the resins used. A supercooled state was achieved, but because of the B-type screw configuration in which usual kneading discs were placed, ($\ln L/L_0$) determined from a lineal length (L) and an initial lineal length ($L_0$) was not more than 2, which results in failing to create a chaotically mixed state, and the value (a)/(b) calculated from a peak half-width (a) and a peak maximum wavelength (b) was not less than 1.5. Thus, an average particle size of the polymer alloy was large, and an uniformity of the dispersed particles was not high. In Comparative Examples 4 to 6, polymer alloys of different compositions were melt-kneaded such that the B-type screw configuration in which usual kneading discs were placed was used and the temperature in the kneading zone was set at a temperature of 15° C. higher than the melting point of a resin having a highest melting point among the resins used. However, since the temperature in the kneading zone was high, a supercooled state was not achieved. Further, because of the B-type screw configuration in which usual kneading discs were placed, in all the compositions, ($\ln L/L_0$) determined from a lineal length (L) and an initial lineal length ($L_0$) was not more than 2, which results in failing to create a chaotically mixed state, and the value (a)/(b) calculated from a peak half-width (a) and a peak maximum wavelength (b) was not less than 1.5. Thus, an average particle size of the polymer alloy was large, and an uniformity of the dispersed particles was not high.

The results in Table 1 show that by lowering the kneading temperature to a supercooled state and using a screw configuration effective to create a chaotically mixed state, a chaotic mixing in which ($\ln L/L_0$) determined from a lineal length (L) and an initial lineal length ($L_0$) was not less than 2 was achieved, and a polymer alloy was obtained having a fine average particle size and in which the uniformity of the dispersed particles was high. These polymer alloys had significantly improved heat resistance and wet-heat resistance compared to those of the polymer alloys obtained by the usual kneading method that failed to achieve a chaotic mixing, and further had mechanical properties excellent in tensile elongation and Izod impact strength.

Examples 5 to 8, Comparative Examples 7 to 9

Raw materials of the composition shown in Table 2 were fed to a twin-screw extruder (TEX30XSSST manufactured by Japan Steel Works, LTD.) (L/D=45.5 (wherein L is the length from a raw material feed port to a discharge port)) set at a screw speed of 100 rpm, and the barrel temperature in the region from a polymer melting zone to a vent was controlled at the temperature shown in Table 2. The gut discharged from a die was immediately quenched in ice water to fix the structure and then pelletized with a strand cutter to obtain pellets.

In Examples 5 to 7, the screw configuration (A1 type) was used in which the zone where melt-kneading was performed while achieving chaotic mixing (chaotic mixing zone 1) was disposed over the whole area such that the percentage of the total length of the chaotic mixing zone 1 based on the full length of the extruder screw was 50%. In Example 8, the screw configuration (A2 type) was used in which the zone where melt-kneading was performed while achieving chaotic mixing (chaotic mixing zone 2) was disposed over the whole area such that the percentage of the total length of the chaotic mixing zone 2 based on the full length of the extruder screw was 50%. In Comparative Examples 7 to 9, as a screw configuration, the screw configuration (B type) was used in which usual kneading discs (L/D=3.8) were placed from the position of L/D=22, 28.

Using SCREWFLOW-MULTI manufactured by Japan Steel Works, LTD., a CAE analysis software for inside an extruder, the initial positions of 1,000 particles were randomly determined at t (time)=0 in a cross-section upstream of a screw, and movement associated with the velocity field determined by analysis of the screw to be evaluated was tracked by simulation. From the record of coordinates of each particle at each kneading temperature, the logarithm of the extension of an imaginary line ($\ln L/L_0$), wherein L is a lineal length, and $L_0$ is an initial lineal length, was determined, and the value of ($\ln L/L_0$) was shown in Table 2.

For samples obtained by cutting out ultrathin sections from the pellets described above, the state of the structure was observed with a transmission electron microscope under 10,000× magnification and all confirmed to be a dispersed structure. For the configuration of the phase structure, either of the configurations of the schematic view shown in FIG. 1 is shown in Table 2.

Further, 100 particles dispersed in the polymer alloy were randomly selected from the electron micrograph. The major axis of each particle was measured, and the number average value was calculated to determine the average particle size. The results are shown in Table 2.

Further, the polymer alloy was sandwiched between cover glasses with a thickness of 0.1 mm and hot-pressed at 230° C. for 10 sec to prepare a sample in the form of a thin film, and a light scattering spectrum was measured with the sample being sandwiched between the cover glasses. The half-width of a peak (a), the wavenumber of the peak maximum (b), and the value (a)/(b) in the spectrum are shown in Table 2.

Using an injection molding machine (SG-75H-MIV) manufactured by Sumitomo Heavy Industries, Ltd. set at 230° C.-235° C.-240° C.-240° C. from below a hopper toward the tip, the pellets described above were molded into the test piece described above at a mold temperature of 80° C. in a molding cycle of a dwell time of 12 seconds and a cooling time of 18 seconds. The test piece obtained was evaluated as described above, and the results are shown in Table 2.

chaotically mixed state, and the value (a)/(b) calculated from a peak half-width (a) and a peak maximum wavelength (b) was not less than 1.5. Thus, an average particle size of the polymer alloy was large, and uniformity of the dispersed particles was not high.

The results in Table 2 show that by lowering the kneading temperature to a supercooled state and using a screw configuration effective to create a chaotically mixed state, a chaotic

TABLE 2

|  |  |  | Example 5 | Example 6 | Example 7 | Example 8 | Comparative Example 7 | Comparative Example 8 | Comparative Example 9 |
|---|---|---|---|---|---|---|---|---|---|
| Composition | PA-1 | Parts by Weight | 70 | 60 | 50 | 70 | 70 | 60 | 50 |
|  | PP-1 | Parts by Weight | 25 | 35 | 45 | 25 | 25 | 35 | 45 |
|  | modified PP | Parts by Weight | 5 | 5 | 5 | 5 | 5 | 5 | 5 |
| Producing method | Melt-kneading Equipment |  | Twin-screw Extruder | | | | | | |
|  | Screw arrange |  | A1 type | A1 type | A1 type | A2 type | B type | B type | B type |
|  | Barrel setting temperature | ° C. | 175 | 175 | 175 | 175 | 240 | 240 | 240 |
|  | Difference between Barrel setting temperature at melt-kneading zone and Melting temperature of polyamide resin | ° C. | −50 | −50 | −50 | −50 | 15 | 15 | 15 |
|  | Difference between Barrel setting temperature at melt-kneading zone and Glass-transition temperature of polyamide resin | ° C. | 128 | 128 | 128 | 128 | 193 | 193 | 193 |
|  | ln L/L$_0$ |  | 4.4 | 4.3 | 4.3 | 4.8 | 1.4 | 1.3 | 1.3 |
|  | Chaotic mixing |  | presence | presence | presence | presence | absence | absence | absence |
| Phase structure (pellets) | Structure |  | dispersed structure | dispersed structure | dispersed structure | dispersed structure | dispersed structure | dispersed structure | dispersed structure |
|  | Average Particle Size | μm | 0.31 | 0.38 | 0.41 | 0.24 | 1.22 | 1.30 | 1.36 |
|  | Peak half-width (a) | nm$^{-1}$ | 0.00367 | 0.00307 | 0.00294 | 0.00462 | absence of peak | absence of peak | absence of peak |
|  | Maximum wavelength of the peak (b) | nm$^{-1}$ | 0.00325 | 0.00265 | 0.00245 | 0.00416 |  |  |  |
|  | (a)/(b) |  | 1.13 | 1.16 | 1.20 | 1.11 |  |  |  |
|  | Configuration |  | a | a | a | a | b | b | b |
| Properties | Heat Resistance (DTUL) | ° C. | 178 | 167 | 158 | 180 | 166 | 156 | 150 |
|  | Tensile Elongation | % | 11.7 | 11.8 | 11.7 | 13.0 | 8 | 7.8 | 7.8 |
|  | Shock Resistance | J/m | 230 | 215 | 210 | 264 | 162 | 150 | 147 |
|  | Wet-Heat Resistance (Flexural modulus) | MPa | 1360 | 1450 | 1570 | 1440 | 850 | 930 | 1050 |

Also in the case of a polymer alloy obtained by melt-kneading a combination of incompatible crystalline resins, by lowering the kneading temperature to a supercooled state and using the A1-type or A2-type screw configuration effective to create a chaotically mixed state, a chaotic mixing in which (ln L/L$_0$) determined from a lineal length (L) and an initial lineal length (L$_0$) was not less than 2 was achieved, and the value (a)/(b) calculated from a peak half-width (a) and a peak maximum wavelength (b) was not more than 1.5. Thus, a polymer alloy was obtained having a fine average particle size and in which the uniformity of the dispersed particles was high.

In Comparative Examples 7 to 9, polymer alloys of different compositions were melt-kneaded such that the B-type screw configuration in which usual kneading discs were placed was used and the temperature in the kneading zone was set at a temperature of 15° C. higher than the melting point of a resin having a highest melting point among the resins used. However, since the temperature in the kneading zone was high, a supercooled state was not achieved. Further, because of the B-type screw configuration in which usual kneading discs were placed, in all the compositions, (ln L/L$_0$) determined from a lineal length (L) and an initial lineal length (L$_0$) was not more than 2, which results in failing to create a mixing in which (ln L/L$_0$) determined from a lineal length (L) and an initial lineal length (L$_0$) was not less than 2 was achieved, and a polymer alloy was obtained having a fine average particle size and in which the uniformity of the dispersed particles was high. These polymer alloys had significantly improved heat resistance and wet-heat resistance compared to those of the polymer alloys obtained by the usual kneading method that failed to achieve a chaotic mixing, and further had mechanical properties excellent in tensile elongation and Izod impact strength.

Examples 9 to 11, Comparative Examples 10 to 12

Raw materials of the composition shown in Table 3 were fed to a twin-screw extruder (TEX30XSSST manufactured by Japan Steel Works, LTD.) (L/D=45.5 (wherein L is the length from a raw material feed port to a discharge port)) set at a screw speed of 100 rpm, and the barrel temperature in the region from a polymer melting zone to a vent was controlled at the temperature shown in Table 3. The gut discharged from a die was immediately quenched in ice water to fix the structure and then pelletized with a strand cutter to obtain pellets.

In Examples 9 to 11, the screw configuration (A1 type) was used in which the zone where melt-kneading was performed while achieving chaotic mixing (chaotic mixing zone 1) was disposed over the whole area such that the percentage of the total length of the chaotic mixing zone 1 based on the full length of the extruder screw was 50%. In Comparative Examples 10 to 12, as a screw configuration, the screw configuration (B type) was used in which usual kneading discs (L/D=3.8) were placed from the position of L/D=22, 28.

Using SCREWFLOW-MULTI manufactured by Japan Steel Works, LTD., a CAE analysis software for inside an extruder, the initial positions of 1,000 particles were randomly determined at t (time)=0 in a cross-section upstream of a screw, and movement associated with the velocity field determined by analysis of the screw to be evaluated was tracked by simulation. From the record of coordinates of each particle at each kneading temperature, the logarithm of the extension of an imaginary line (ln L/L$_0$), wherein L is a lineal length, and L$_0$ is an initial lineal length, was determined, and the value of (ln L/L$_0$) was shown in Table 3.

For samples obtained by cutting out ultrathin sections from the pellets described above, the state of the structure was observed with a transmission electron microscope under 10,000× magnification and all confirmed to be a dispersed structure. For the configuration of the phase structure, either of the configurations of the schematic view shown in FIG. 1 is shown in Table 3.

Further, 100 particles dispersed in the polymer alloy were randomly selected from the electron micrograph. The major axis of each particle was measured, and the number average value was calculated to determine the average particle size. The results are shown in Table 3.

Further, the polymer alloy was sandwiched between cover glasses with a thickness of 0.1 mm and hot-pressed at 230° C. for 10 sec to prepare a sample in the form of a thin film, and a light scattering spectrum was measured with the sample being sandwiched between the cover glasses. The half-width of a peak (a), the wavenumber of the peak maximum (b), and the value (a)/(b) in the spectrum are shown in Table 3.

Using an injection molding machine (SG-75H-MIV) manufactured by Sumitomo Heavy Industries, Ltd. set at 230° C.-235° C.-240° C.-240° C. from below a hopper toward the tip, the pellets described above were molded into the test piece described above at a mold temperature of 80° C. in a molding cycle of a dwell time of 12 seconds and a cooling time of 18 seconds. The test piece obtained was evaluated as described above, and the results are shown in Table 3.

TABLE 3

|  |  |  | Example 9 | Example 10 | Example 11 | Comparative Example 10 | Comparative Example 11 | Comparative Example 12 |
|---|---|---|---|---|---|---|---|---|
| Composition | PA-1 | Parts by Weight | 70 | 60 | 50 | 70 | 60 | 50 |
|  | PP-1 | Parts by Weight | 30 | 40 | 50 | 30 | 40 | 50 |
|  | Inorganic fillers | Parts by Weight | 25 | 25 | 25 | 25 | 25 | 25 |
| Producing method | Melt-kneading Equipment |  | Twin-screw Extruder | | | | | |
|  | Screw arrange |  | A1 type | A1 type | A1 type | B type | B type | B type |
|  | Barrel setting temparature | ° C. | 175 | 175 | 175 | 240 | 240 | 240 |
|  | Difference between Barrel setting temparature at melt-kneading zone and Melting temperature of polyamide resin | ° C. | −50 | −50 | −50 | 15 | 15 | 15 |
|  | Difference between Barrel setting temparature at melt-kneading zone and Glass-transition temperature of polyamide resin | ° C. | 128 | 128 | 128 | 193 | 193 | 193 |
|  | ln L/L$_0$ |  | 4.4 | 4.3 | 4.3 | 1.4 | 1.3 | 1.3 |
|  | Chaotic mixing |  | presence | presence | presence | absence | absence | absence |
| Phase structure (pellets) | Structure |  | dispersed structure | dispersed structure | dispersed structure | dispersed structure | dispersed structure | dispersed structure |
|  | Average Particle Size | μm | 0.56 | 0.59 | 0.63 | 8.94 | 9.73 | 9.98 |
|  | Peak half-width (a) | nm$^{-1}$ | 0.00236 | 0.00230 | 0.00219 | absence of peak | absence of peak | absence of peak |
|  | Maximum wavelength of the peak (b) | nm$^{-1}$ | 0.00180 | 0.00170 | 0.00160 |  |  |  |
|  | (a)/(b) |  | 1.31 | 1.35 | 1.37 |  |  |  |
|  | Configuration |  | a | a | a | b | b | b |
| Properties | Heat Resistance (DTUL) | ° C. | 195 | 182 | 175 | 188 | 172 | 163 |
|  | Tensile Elongation | % | 5 | 5.1 | 4.9 | 2.5 | 2.3 | 2.4 |
|  | Flexural modulus | MPa | 3910 | 3800 | 3650 | 3810 | 3680 | 3550 |
|  | Wet-Heat Resistance (Flexural modulus) | MPa | 2350 | 2410 | 2510 | 1560 | 1610 | 1740 |

Also in the case of a polymer alloy obtained by melt-kneading a combination of incompatible crystalline resins with inorganic fillers added, by lowering the kneading temperature to a supercooled state and using the A1-type screw configuration effective for creating a chaotically mixed state, a chaotic mixing in which (ln L/L$_0$) determined from a lineal length (L) and an initial lineal length (L$_0$) was not less than 2 was achieved, and the value (a)/(b) calculated from a peak half-width (a) and a peak maximum wavelength (b) was not more than 1.5. Thus, a polymer alloy was obtained having a fine average particle size and in which the uniformity of the dispersed particles was high.

In Comparative Examples 10 to 12, polymer alloys of different compositions were melt-kneaded such that the B-type screw configuration in which usual kneading discs were placed was used and the temperature in the kneading zone was set at a temperature of 15° C. higher than the melting point of a resin having a highest melting point among the resins used. However, since the temperature in the kneading zone was high, a supercooled state was not achieved. Further, because of the B-type screw configuration in which usual kneading discs were placed, in all the compositions, (ln L/L$_0$) determined from a lineal length (L) and an initial lineal length (L$_0$) was not more than 2, which results in failing to create a chaotically mixed state, and the value (a)/(b) calculated from a peak half-width (a) and a peak maximum wavelength (b) was not less than 1.5. Thus, an average particle size of the polymer alloy was large, and uniformity of the dispersed particles was not high.

The results in Table 3 show that by lowering the kneading temperature to a supercooled state and using a screw configuration effective to create a chaotically mixed state, a chaotic mixing in which ($\ln L/L_0$) determined from a lineal length (L) and an initial lineal length ($L_0$) was not less than 2 was achieved, and a polymer alloy was obtained having a fine average particle size and in which the uniformity of the dispersed particles was high. These polymer alloys had significantly improved heat resistance and wet-heat resistance compared to those of the polymer alloys obtained by the usual kneading method that failed to achieve a chaotic mixing, and further had mechanical properties excellent in tensile elongation and flexural modulus.

Examples 12 to 14, Comparative Examples 13 to 15

Raw materials of the composition shown in Table 4 were fed to a twin-screw extruder (TEX30XSSST manufactured by Japan Steel Works, LTD.) (L/D=45.5 (wherein L is the length from a raw material feed port to a discharge port)) set at a screw speed of 100 rpm, and the barrel temperature in the region from a polymer melting zone to a vent was controlled at the temperature shown in Table 3. The gut discharged from a die was immediately quenched in ice water to fix the structure and then pelletized with a strand cutter to obtain pellets.

In Examples 12 to 14, the screw configuration (A1 type) was used in which the zone where melt-kneading was performed while achieving chaotic mixing (chaotic mixing zone 1) was disposed over the whole area such that the percentage of the total length of the chaotic mixing zone 1 based on the full length of the extruder screw was 50%. In Comparative Examples 13 to 15, as a screw configuration, the screw configuration (B type) was used in which usual kneading discs (L/D=3.8) were placed from the position of L/D=22, 28.

Using SCREWFLOW-MULTI manufactured by Japan Steel Works, LTD., a CAE analysis software for inside an extruder, the initial positions of 1,000 particles were randomly determined at t (time)=0 in a cross-section upstream of a screw, and movement associated with the velocity field determined by analysis of the screw to be evaluated was tracked by simulation. From the record of coordinates of each particle at each kneading temperature, the logarithm of the extension of an imaginary line ($\ln L/L_0$), wherein L is a lineal length, and $L_0$ is an initial lineal length, was determined, and the value of ($\ln L/L_0$) was shown in Table 1.

For samples obtained by cutting out ultrathin sections from the pellets described above, the state of the structure was observed with a transmission electron microscope under 10,000× magnification and all confirmed to be a dispersed structure. For the configuration of the phase structure, either of the configurations of the schematic view shown in FIG. 1 is shown in Table 4.

Further, 100 particles dispersed in the polymer alloy were randomly selected from the electron micrograph. The major axis of each particle was measured, and the number average value was calculated to determine the average particle size. The results are shown in Table 4.

Further, the polymer alloy was sandwiched between cover glasses with a thickness of 0.1 mm and hot-pressed at 230° C. for 10 sec to prepare a sample in the form of a thin film, and a light scattering spectrum was measured with the sample being sandwiched between the cover glasses. The half-width of a peak (a), the wavenumber of the peak maximum (b), and the value (a)/(b) in the spectrum are shown in Table 4.

Using an injection molding machine (SG-75H-MIV) manufactured by Sumitomo Heavy Industries, Ltd. set at 230° C.-235° C.-240° C.-240° C. from below a hopper toward the tip, the pellets described above were molded into the test piece described above at a mold temperature of 80° C. in a molding cycle of a dwell time of 12 seconds and a cooling time of 18 seconds. The test piece obtained was evaluated as described above, and the results are shown in Table 4.

TABLE 4

| | | | Example 12 | Example 13 | Example 14 | Comparative Example 13 | Comparative Example 14 | Comparative Example 15 |
|---|---|---|---|---|---|---|---|---|
| Composition | PA-1 | Parts by Weight | 70 | 60 | 50 | 70 | 60 | 50 |
| | PP-1 | Parts by Weight | 25 | 35 | 45 | 25 | 35 | 45 |
| | modified PP | Parts by Weight | 5 | 5 | 5 | 5 | 5 | 5 |
| | Inorganic fillers | Parts by Weight | 25 | 25 | 25 | 25 | 25 | 25 |
| Producing method | Melt-kneading Equipment | | Twin-screw Extruder | | | | | |
| | Screw arrange | | A1 type | A1 type | A1 type | B type | B type | B type |
| | Barrel setting temparature | ° C. | 175 | 175 | 175 | 240 | 240 | 240 |
| | Difference between Barrel setting temparature at melt-kneading zone and Melting temperature of polyamide resin | ° C. | −50 | −50 | −50 | 15 | 15 | 15 |
| | Difference between Barrel setting temparature at melt-kneading zone and Glass-transition temperature of polyamide resin | ° C. | 128 | 128 | 128 | 193 | 193 | 193 |
| | $\ln L/L_0$ | | 4.4 | 4.3 | 4.3 | 1.4 | 1.3 | 1.3 |
| | Chaotic mixing | | presence | presence | presence | absence | absence | absence |
| Phase structure (pellets) | Structure | | dispersed structure | dispersed structure | dispersed structure | dispersed structure | dispersed structure | dispersed structure |
| | Average Particle Size | μm | 0.34 | 0.45 | 0.50 | 3.98 | 4.52 | 5.23 |
| | Peak half-width (a) | nm$^{-1}$ | 0.00360 | 0.00279 | 0.00254 | absence of peak | absence of peak | absence of peak |
| | Maximum wavelength of the peak (b) | nm$^{-1}$ | 0.00295 | 0.00220 | 0.00200 | | | |
| | (a)/(b) | | 1.22 | 1.27 | 1.27 | | | |
| | Configuration | | a | a | a | b | b | b |

TABLE 4-continued

|  |  |  | Example 12 | Example 13 | Example 14 | Comparative Example 13 | Comparative Example 14 | Comparative Example 15 |
|---|---|---|---|---|---|---|---|---|
| Properties | Heat Resistance (DTUL) | °C. | 180 | 168 | 160 | 170 | 158 | 152 |
|  | Tensile Elongation | % | 6.1 | 6 | 6 | 4.5 | 4.4 | 4.4 |
|  | Flexural modulus | MPa | 4030 | 3850 | 3710 | 3750 | 3500 | 3400 |
|  | Wet-Heat Resistance (Flexural modulus) | MPa | 2410 | 2500 | 2600 | 1590 | 1630 | 1760 |

Also in the case of a polymer alloy obtained by melt-kneading a combination of incompatible crystalline resins with inorganic fillers added, by lowering the kneading temperature to a supercooled state and using the A1-type screw configuration effective for creating a chaotically mixed state, a chaotic mixing in which (ln $L/L_0$) determined from a lineal length (L) and an initial lineal length ($L_0$) was not less than 2 was achieved, and the value (a)/(b) calculated from a peak half-width (a) and a peak maximum wavelength (b) was not more than 1.5. Thus, a polymer alloy was obtained having a fine average particle size and in which the uniformity of the dispersed particles was high.

In Comparative Examples 13 to 15, polymer alloys of different compositions were melt-kneaded such that the B-type screw configuration in which usual kneading discs were placed was used and the temperature in the kneading zone was set at a temperature of 15° C. higher than the melting point of a resin having a highest melting point among the resins used. However, since the temperature in the kneading zone was high, a supercooled state was not achieved. Further, because of the B-type screw configuration in which usual kneading discs were placed, in all the compositions, (ln $L/L_0$) determined from a lineal length (L) and an initial lineal length ($L_0$) was not more than 2, which results in failing to create a chaotically mixed state, and the value (a)/(b) calculated from a peak half-width (a) and a peak maximum wavelength (b) was not less than 1.5. Thus, an average particle size of the polymer alloy was large, and uniformity of the dispersed particles was not high.

The results in Table 4 show that by lowering the kneading temperature to a supercooled state and using a screw configuration effective to create a chaotically mixed state, a chaotic mixing in which (ln $L/L_0$) determined from a lineal length (L) and an initial lineal length ($L_0$) was not less than 2 was achieved, and a polymer alloy was obtained having a fine average particle size and in which the uniformity of the dispersed particles was high. These polymer alloys had significantly improved heat resistance and wet-heat resistance compared to those of the polymer alloys obtained by the usual kneading method that failed to achieve a chaotic mixing, and further had mechanical properties excellent in tensile elongation and flexural modulus.

Examples 15 to 18, Comparative Examples 16 to 18

Raw materials of the composition shown in Table 5 were fed to a twin-screw extruder (TEX30XSSST manufactured by Japan Steel Works, LTD.) (L/D=45.5 (wherein L is the length from a raw material feed port to a discharge port)) set at a screw speed of 100 rpm, and the barrel temperature in the region from a polymer melting zone to a vent was controlled at the temperature shown in Table 5. The gut discharged from a die was immediately quenched in ice water to fix the structure and then pelletized with a strand cutter to obtain pellets.

In Examples 15 to 18, the screw configuration (A1 type) was used in which the zone where melt-kneading was performed while achieving chaotic mixing (chaotic mixing zone 1) was disposed over the whole area such that the percentage of the total length of the chaotic mixing zone 1 based on the full length of the extruder screw was 50%. In Example 18, the screw configuration (A2 type) was used in which the zone where melt-kneading was performed while achieving chaotic mixing (chaotic mixing zone 2) was disposed over the whole area such that the percentage of the total length of the chaotic mixing zone 2 based on the full length of the extruder screw was 50%. In Comparative Examples 16 to 18, as a screw configuration, the screw configuration (B type) was used in which usual kneading discs (L/D=3.8) were placed from the position of L/D=22, 28.

Using SCREWFLOW-MULTI manufactured by Japan Steel Works, LTD., a CAE analysis software for inside an extruder, the initial positions of 1,000 particles were randomly determined at t (time)=0 in a cross-section upstream of a screw, and movement associated with the velocity field determined by analysis of the screw to be evaluated was tracked by simulation. From the record of coordinates of each particle at each kneading temperature, the logarithm of the extension of an imaginary line (ln $L/L_0$), wherein L is a lineal length, and $L_0$ is an initial lineal length, was determined, and the value of (ln $L/L_0$) was shown in Table 5.

For samples obtained by cutting out ultrathin sections from the pellets described above, the state of the structure was observed with a transmission electron microscope under 10,000× magnification and all confirmed to be a dispersed structure. For the configuration of the phase structure, either of the configurations of the schematic view shown in FIG. 1 is shown in Table 5.

Further, 100 particles dispersed in the polymer alloy were randomly selected from the electron micrograph. The major axis of each particle was measured, and the number average value was calculated to determine the average particle size. The results are shown in Table 5.

Further, the polymer alloy was sandwiched between cover glasses with a thickness of 0.1 mm and hot-pressed at 230° C. for 10 sec to prepare a sample in the form of a thin film, and a light scattering spectrum was measured with the sample being sandwiched between the cover glasses. The half-width of a peak (a), the wavenumber of the peak maximum (b), and the value (a)/(b) in the spectrum are shown in Table 5.

The pellets described above were hot-pressed at 230° C. and 1.5 MPa for 10 sec to produce a sheet (thickness: 0.3 mm). A sample of length×width×thickness=50 mm×10 mm×0.3 mm was cut out from the sheet, and the sample obtained was evaluated as described above.

The results are shown in Table 5.

TABLE 5

| | | | Example 15 | Example 16 | Example 17 | Example 18 | Comparative Example 16 | Comparative Example 17 | Comparative Example 18 |
|---|---|---|---|---|---|---|---|---|---|
| Composition | PA-2 | Parts by Weight | 40 | 35 | 30 | 40 | 40 | 35 | 30 |
| | PP-2 | Parts by Weight | 45 | 50 | 55 | 45 | 45 | 50 | 55 |
| | modified PP | Parts by Weight | 15 | 15 | 15 | 15 | 15 | 15 | 15 |
| Producing method | Melt-kneading Equipment | | Twin-screw Extruder | | | | | | |
| | Screw arrange | | A1 type | A1 type | A1 type | A2 type | B type | B type | B type |
| | Barrel setting temparature | °C. | 155 | 155 | 155 | 155 | 240 | 240 | 240 |
| | Difference between Barrel setting temparature at melt-kneading zone and Melting temperature of polyamide resin | °C. | −70 | −70 | −70 | −70 | 15 | 15 | 15 |
| | Difference between Barrel setting temparature at melt-kneading zone and Glass-transition temperature of polyamide resin | °C. | 115 | 115 | 115 | 115 | 200 | 200 | 200 |
| | ln $L/L_0$ | | 4.4 | 4.5 | 4.5 | 4.8 | 1.4 | 1.4 | 1.5 |
| | Chaotic mixing | | presence | presence | presence | presence | absence | absence | absence |
| Phase structure (pellets) | Structure | | dispersed structure | dispersed structure | dispersed structure | dispersed structure | dispersed structure | dispersed structure | dispersed structure |
| | Average Particle Size | μm | 0.89 | 0.52 | 0.21 | 0.71 | 4.47 | 2.13 | 0.77 |
| | Peak half-width (a) | $nm^{-1}$ | 0.00157 | 0.00265 | 0.00618 | 0.00182 | absence of peak | absence of peak | 0.00238 |
| | Maximum wavelength of the peak (b) | $nm^{-1}$ | 0.00113 | 0.00192 | 0.00475 | 0.00140 | | | 0.00132 |
| | (a)/(b) | | 1.39 | 1.38 | 1.30 | 1.30 | | | 1.80 |
| | Configuration | | a | a | a | a | b | b | b |
| Properties | Tensile Strength | MPa | 41 | 42 | 43 | 42 | 38 | 39 | 40 |
| | Tensile Elongation | % | 500 | 450 | 480 | 530 | 350 | 310 | 340 |
| | Tensile Modulus | MPa | 1280 | 1350 | 1410 | 1380 | 1230 | 1300 | 1350 |
| | Wet-Heat Resistance (Tensile Elongation) | % | 170 | 200 | 220 | 200 | 70 | 80 | 90 |

Also in the case of a polymer alloy obtained by melt-kneading a combination of incompatible crystalline resins, by lowering the kneading temperature to a supercooled state and using the A1-type or A2-type screw configuration effective for creating a chaotically mixed state, a chaotic mixing in which (ln $L/L_0$) determined from a lineal length (L) and an initial lineal length ($L_0$) was not less than 2 was achieved, and the value (a)/(b) calculated from a peak half-width (a) and a peak maximum wavelength (b) was not more than 1.5. Thus, a polymer alloy was obtained having a fine average particle size and in which the uniformity of the dispersed particles was high.

In Comparative Examples 16 to 18, polymer alloys of different compositions were melt-kneaded such that the B-type screw configuration in which usual kneading discs were placed was used and the temperature in the kneading zone was set at a temperature of 15° C. higher than the melting point of a resin having a highest melting point among the resins used. However, since the temperature in the kneading zone was high, a supercooled state was not achieved. Further, because of the B-type screw configuration in which usual kneading discs were placed, in all the compositions, (ln $L/L_0$) determined from a lineal length (L) and an initial lineal length ($L_0$) was not more than 2, which results in failing to create a chaotically mixed state, and the value (a)/(b) calculated from a peak half-width (a) and a peak maximum wavelength (b) was not less than 1.5. Thus, an average particle size of the polymer alloy was large, and uniformity of the dispersed particles was not high.

The results in Table 5 show that by lowering the kneading temperature to a supercooled state and using a screw configuration effective to create a chaotically mixed state, a chaotic mixing in which (ln $L/L_0$) determined from a lineal length (L) and an initial lineal length ($L_0$) was not less than 2 was achieved, and a polymer alloy was obtained having a fine average particle size and in which the uniformity of the dispersed particles was high. These polymer alloys had significantly improved wet-heat resistance compared to those of the polymer alloys obtained by the usual kneading method that failed to achieve a chaotic mixing, and further had mechanical properties excellent in tensile strength, tensile elongation, and tensile modulus.

Examples 19 to 22, Comparative Examples 19 to 20

Raw materials of the composition shown in Table 6 were fed to a twin-screw extruder (TEX30XSSST manufactured by Japan Steel Works, LTD.) (L/D=45.5 (wherein L is the length from a raw material feed port to a discharge port)) set at a screw speed of 100 rpm, and the barrel temperature in the region from a polymer melting zone to a vent was controlled at the temperature shown in Table 6. The gut discharged from a die was immediately quenched in ice water to fix the structure and then pelletized with a strand cutter to obtain pellets.

In Examples 19 to 20, the screw configuration (A1 type) was used in which the zone where melt-kneading was performed while achieving chaotic mixing (chaotic mixing zone 1) was disposed over the whole area such that the percentage of the total length of the chaotic mixing zone 1 based on the full length of the extruder screw was 50%. In Examples 21 to 22, the screw configuration (A2 type) was used in which the zone where melt-kneading was performed while achieving chaotic mixing (chaotic mixing zone 2) was disposed over the whole area such that the percentage of the total length of the chaotic mixing zone 2 based on the full length of the extruder screw was 50%. In Comparative Examples 16 to 18, as a screw configuration, the screw configuration (B type) was used in which usual kneading discs (L/D=3.8) were placed from the position of L/D=22, 28.

Using SCREWFLOW-MULTI manufactured by Japan Steel Works, LTD., a CAE analysis software for inside an extruder, the initial positions of 1,000 particles were randomly determined at t (time)=0 in a cross-section upstream of a screw, and movement associated with the velocity field determined by analysis of the screw to be evaluated was tracked by simulation. From the record of coordinates of each particle at each kneading temperature, the logarithm of the extension of an imaginary line (ln $L/L_0$), wherein L is a lineal length, and $L_0$ is an initial lineal length, was determined, and the value of (ln $L/L_0$) was shown in Table 6.

For samples obtained by cutting out ultrathin sections from the pellets described above, the state of the structure was observed with a transmission electron microscope under 10,000× magnification and all confirmed to be a dispersed structure. For the configuration of the phase structure, either of the configurations of the schematic view shown in FIG. 1 is shown in Table 6.

Further, 100 particles dispersed in the polymer alloy were randomly selected from the electron micrograph. The major axis of each particle was measured, and the number average value was calculated to determine the average particle size. The results are shown in Table 6.

Further, the polymer alloy was sandwiched between cover glasses with a thickness of 0.1 mm and hot-pressed at 270° C. for 10 sec to prepare a sample in the form of a thin film, and a light scattering spectrum was measured with the sample being sandwiched between the cover glasses. The half-width of a peak (a), the wavenumber of the peak maximum (b), and the value (a)/(b) in the spectrum are shown in Table 6.

The pellets described above were hot-pressed at 270° C. and 1.5 MPa for 10 sec to produce a sheet (thickness: 0.3 mm). A sample of length×width×thickness=50 mm×10 mm×0.3 mm was cut out from the sheet, and the sample obtained was evaluated as described above. The results are shown in Table 6.

TABLE 6

| | | | Example 19 | Example 20 | Example 21 | Example 22 | Comparative Example 19 | Comparative Example 20 |
|---|---|---|---|---|---|---|---|---|
| Composition | PET | Parts by Weight | 70 | 70 | 70 | 70 | 70 | 70 |
| | PMP | Parts by Weight | 30 | 25 | 30 | 25 | 30 | 25 |
| | modified PMP | Parts by Weight | | 5 | | 5 | | 5 |
| Producing method | Melt-kneading Equipment | | | | Twin-screw Extruder | | | |
| | Screw arrange | | A1 type | A1 type | A2 type | A2 type | B type | B type |
| | Barrel setting temparature | ° C. | 215 | 215 | 215 | 215 | 280 | 280 |
| | Difference between Barrel setting temparature at melt-kneading zone and Melting temperature of PET resin | ° C. | −49 | −49 | −49 | −49 | 16 | 16 |
| | Difference between Barrel setting temparature at melt-kneading zone and Glass-transition temperature of PET resin | ° C. | 135 | 135 | 135 | 135 | 200 | 200 |
| | ln $L/L_0$ | | 4.3 | 4.3 | 4.8 | 4.8 | 1.3 | 1.3 |
| | Chaotic mixing | | presence | presence | presence | presence | absence | absence |
| Phase structure (pellets) | Structure | | dispersed structure | dispersed structure | dispersed structure | dispersed structure | dispersed structure | dispersed structure |
| | Average Particle Size | μm | 0.89 | 0.52 | 0.74 | 0.33 | 3.53 | 2.25 |
| | Peak half-width (a) | nm$^{-1}$ | 0.00148 | 0.00228 | 0.00170 | 0.00351 | absence of peak | absence of peak |
| | Maximum wavelength of the peak (b) | nm$^{-1}$ | 0.00113 | 0.00192 | 0.00135 | 0.00303 | | |
| | (a)/(b) | | 1.31 | 1.19 | 1.26 | 1.16 | | |
| | Configuration | | a | a | a | a | b | b |
| Properties | Tensile Strength | MPa | 33 | 42 | 36 | 44 | 29 | 30 |
| | Tensile Elongation | % | 400 | 430 | 430 | 460 | 310 | 330 |
| | Tensile Modulus | MPa | 1460 | 1540 | 1500 | 1570 | 1360 | 1400 |
| | Wet-Heat Resistance (Tensile Strength) | MPa | 22 | 29 | 25 | 31 | 10 | 11 |

Also in the case of a polymer alloy obtained by melt-kneading a combination of incompatible crystalline resins, by lowering the kneading temperature to a supercooled state and using the A1-type or A2-type screw configuration effective for creating a chaotically mixed state, a chaotic mixing in which (ln $L/L_0$) determined from a lineal length (L) and an initial lineal length ($L_0$) was not less than 2 was achieved, and the value (a)/(b) calculated from a peak half-width (a) and a peak maximum wavelength (b) was not more than 1.5. Thus, a polymer alloy was obtained having a fine average particle size and in which the uniformity of the dispersed particles was high.

In Comparative Examples 19 to 20, polymer alloys of different compositions were melt-kneaded such that the B-type screw configuration in which usual kneading discs were placed was used and the temperature in the kneading zone was set at a temperature of 16° C. higher than the melting point of a resin having a highest melting point among the resins used. However, since the temperature in the kneading zone was high, a supercooled state was not achieved. Further, because of the B-type screw configuration in which usual kneading discs were placed, in all the compositions, (ln $L/L_0$) determined from a lineal length (L) and an initial lineal length ($L_0$) was not more than 2, which results in failing to create a chaotically mixed state, and the value (a)/(b) calculated from a peak half-width (a) and a peak maximum wavelength (b) was not less than 1.5. Thus, an average particle size of the polymer alloy was large, and uniformity of the dispersed particles was not high.

The results in Table 6 show that by lowering the kneading temperature to a supercooled state and using a screw configuration effective to create a chaotically mixed state, a chaotic mixing in which (ln $L/L_0$) determined from a lineal length (L) and an initial lineal length ($L_0$) was not less than 2 was achieved, and a polymer alloy was obtained having a fine average particle size and in which the uniformity of the dispersed particles was high. These polymer alloys had significantly improved wet-heat resistance compared to those of the polymer alloys obtained by the usual kneading method that failed to achieve a chaotic mixing, and further had mechanical properties excellent in tensile strength, tensile elongation, and tensile modulus.

INDUSTRIAL APPLICABILITY

According to our processes of producing a polymer alloy, particles dispersed in an incompatible polymer alloy comprising at least two or more crystalline resins can be uniformly and finely controlled. As a result, a polymer alloy having excellent heat resistance, wet-heat resistance, and mechanical properties can be obtained. Taking advantage of these properties, the polymer alloy obtained by the process of producing a polymer alloy can be advantageously used as structural material. Taking advantage of these properties, the polymer alloy can be widely used as a molded article, and can be advantageously used particularly in automobile exterior applications and electric and electronic part applications.

The invention claimed is:

1. A process of producing a polymer alloy comprising melt-kneading at least two incompatible crystalline resins in a supercooled state by chaotic mixing with a twin-screw extruder wherein the chaotic mixing is chaotic mixing in which, according to the particle tracking method, a logarithm of extension of an imaginary line (ln $L/L_0$), wherein L is a lineal length, and $L_0$ is an initial lineal length, is not less than 2 and the supercooled state is a state in which a kneading temperature in a region from a polymer melting zone to a die-head is set at a temperature at least 75° C. higher than the glass transition temperature of a resin having a highest glass transition temperature among the crystalline resins used in the process of producing the polymer alloy, and set at a temperature 10° to 70° C. lower than the melting point of a resin having a highest melting point among the crystalline resins used in the process of producing the polymer alloy and wherein the resins are melted even at a temperature of 10 to 70° C. lower than the melting point of the resin having a highest melting point among the crystalline resins used in the process of producing the polymer alloy.

2. The process according to claim 1, wherein the at least two incompatible crystalline resins are selected from the group consisting of polyamide, polyester, polyphenylene sulfide, polylactic acid, polypropylene, and polymethylpentene.

* * * * *

UNITED STATES PATENT AND TRADEMARK OFFICE
CERTIFICATE OF CORRECTION

PATENT NO. : 9,175,164 B2
APPLICATION NO. : 14/119207
DATED : November 3, 2015
INVENTOR(S) : Ochiai et al.

Page 1 of 1

It is certified that error appears in the above-identified patent and that said Letters Patent is hereby corrected as shown below:

On the title page

At (73) Assignee, please change "Torray" to --Toray--.

Signed and Sealed this
Twenty-second Day of March, 2016

Michelle K. Lee
*Director of the United States Patent and Trademark Office*